(12) United States Patent
Gleason

(10) Patent No.: US 11,585,524 B1
(45) Date of Patent: Feb. 21, 2023

(54) APPARATUS FOR IMPROVING ACCESSORIES

(71) Applicant: HUT ENTERPRISES LLC, Middletown, DE (US)

(72) Inventor: John Paul Gleason, Grosse Point, MI (US)

(73) Assignee: HUT ENTERPRISES LLC, Middletown, DE (US)

( * ) Notice: Subject to any disclaimer, the term of this patent is extended or adjusted under 35 U.S.C. 154(b) by 0 days.

(21) Appl. No.: 17/539,197

(22) Filed: Dec. 1, 2021

Related U.S. Application Data

(63) Continuation of application No. 17/089,615, filed on Nov. 4, 2020, now Pat. No. 11,204,161.

(60) Provisional application No. 63/068,004, filed on Aug. 20, 2020, provisional application No. 63/048,832, filed on Jul. 7, 2020.

(51) Int. Cl.
| | |
|---|---|
| *F21V 33/00* | (2006.01) |
| *A45C 11/04* | (2006.01) |
| *F21V 19/00* | (2006.01) |
| *G02C 5/00* | (2006.01) |
| *H05B 47/10* | (2020.01) |

(52) U.S. Cl.
CPC .......... *F21V 33/0004* (2013.01); *A45C 11/04* (2013.01); *F21V 19/001* (2013.01); *G02C 5/008* (2013.01); *H05B 47/10* (2020.01)

(58) Field of Classification Search
CPC .... F21V 33/0004; F21V 19/001; F21V 33/00; F21V 99/00; F21V 15/00; F21V 14/01; H05B 47/10; A45C 11/04; A45C 11/00; A45C 11/36; G02C 5/008; G02C 5/00
See application file for complete search history.

(56) References Cited

U.S. PATENT DOCUMENTS

| | | | | |
|---|---|---|---|---|
| 5,440,354 | A * | 8/1995 | Just | G02C 5/008 351/158 |
| 6,405,858 | B1 * | 6/2002 | Gagliardi | A45C 11/16 84/94.2 |
| 7,204,614 | B2 * | 4/2007 | Hanis | A47G 23/0309 362/267 |
| 7,775,675 | B2 * | 8/2010 | Hamm | A45C 11/04 362/276 |
| 8,622,540 | B2 * | 1/2014 | Burnstein | G02C 11/02 351/52 |
| 10,072,837 | B2 * | 9/2018 | Hong | F21V 33/0004 |
| 11,204,161 | B1 * | 12/2021 | Gleason | A45C 11/04 |

(Continued)

*Primary Examiner* — Bao Q Truong
(74) *Attorney, Agent, or Firm* — Christopher P. Maiorana, PC

(57) ABSTRACT

An apparatus includes a container, a plurality of lights and a circuit. The container may comprise an outer shell comprising a material configured to protect contents of the apparatus and an inner surface. The outer shell may be configured to open to enable the contents to be placed on the inner surface. A cavity may be formed within the container when the outer shell is closed. The plurality of lights implemented on the inner surface may each be configured to adjust a characteristic of light output in response to a signal. The circuit may be configured to generate the signal in response to an input. The circuit may be implemented between the outer shell and the inner surface. A reactive material of the contents of the container may be configured to change appearance in response to the characteristic of light.

20 Claims, 11 Drawing Sheets

(56) References Cited

U.S. PATENT DOCUMENTS

2012/0292205 A1* 11/2012 Waters ................ A45C 15/06
 206/216
2018/0298181 A1* 10/2018 Collini ................ C08L 33/12

* cited by examiner

APPARATUS FOR IMPROVING ACCESSORIES

This application relates to U.S. application Ser. No. 17/089,615, filed on Nov. 4, 2020, which relates to U.S. Provisional Application No. 63/068,004, filed on Aug. 20, 2020. This application also relates to U.S. Provisional Application 63/048,832, filed on Jul. 7, 2020. Each of the mentioned applications are hereby incorporated by reference in its entirety.

FIELD OF THE INVENTION

The invention relates to fashion and technology accessories generally and, more particularly, to a method and/or apparatus for implementing an apparatus for improving accessories.

BACKGROUND

Some estimates indicate that at least 60% of people wear eyeglasses. Frames for eyeglasses come in many different styles and color combinations. However, purchasing eyeglasses can be very expensive. Since eyeglasses have a considerable cost, many eyeglass wearers only buy a single pair of eyeglasses.

Despite having many options for style, it can be prohibitively expensive for an eyeglass wearer to have more than one option. Conventional eyeglass frames lack the ability to change appearance based on the desire of the user. This inability to change style includes, but is not limited to, color, style and design. Eyeglasses wearers are effectively 'stuck' with the eyeglasses they first chose when they fill a lens prescription.

Similar issues exist with other types accessories (both wearable and non-wearable). Items such as earbuds, watches and smartphone cases might be available in multiple color options. However, buying multiple versions of the same product in order to have multiple options for colors can be prohibitively expensive, increases waste, and requires the product manufacturer to produce multiple different versions of the same product. Often times, accessories are only made available in a single color (i.e., black), because the market for other colors might not be as large. Both manufacturers and consumers can be limited to a fixed color/design. There is an inability to change the color/design of an accessory based on a desire of the user. The ability to change the appearance of the accessory may provide the consumer with enjoyment of the product.

It would be desirable to implement an apparatus for improving accessories.

SUMMARY

The invention concerns an apparatus comprising a container, a plurality of lights and a circuit. The container may comprise an outer shell comprising a material configured to protect contents of the apparatus and an inner surface. The outer shell may be configured to open to enable the contents to be placed on the inner surface. A cavity may be formed within the container when the outer shell is closed. The plurality of lights implemented on the inner surface may each be configured to adjust a characteristic of light output in response to a signal. The circuit may be configured to generate the signal in response to an input. The circuit may be implemented between the outer shell and the inner surface. A reactive material of the contents of the container may be configured to change appearance in response to the characteristic of light.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
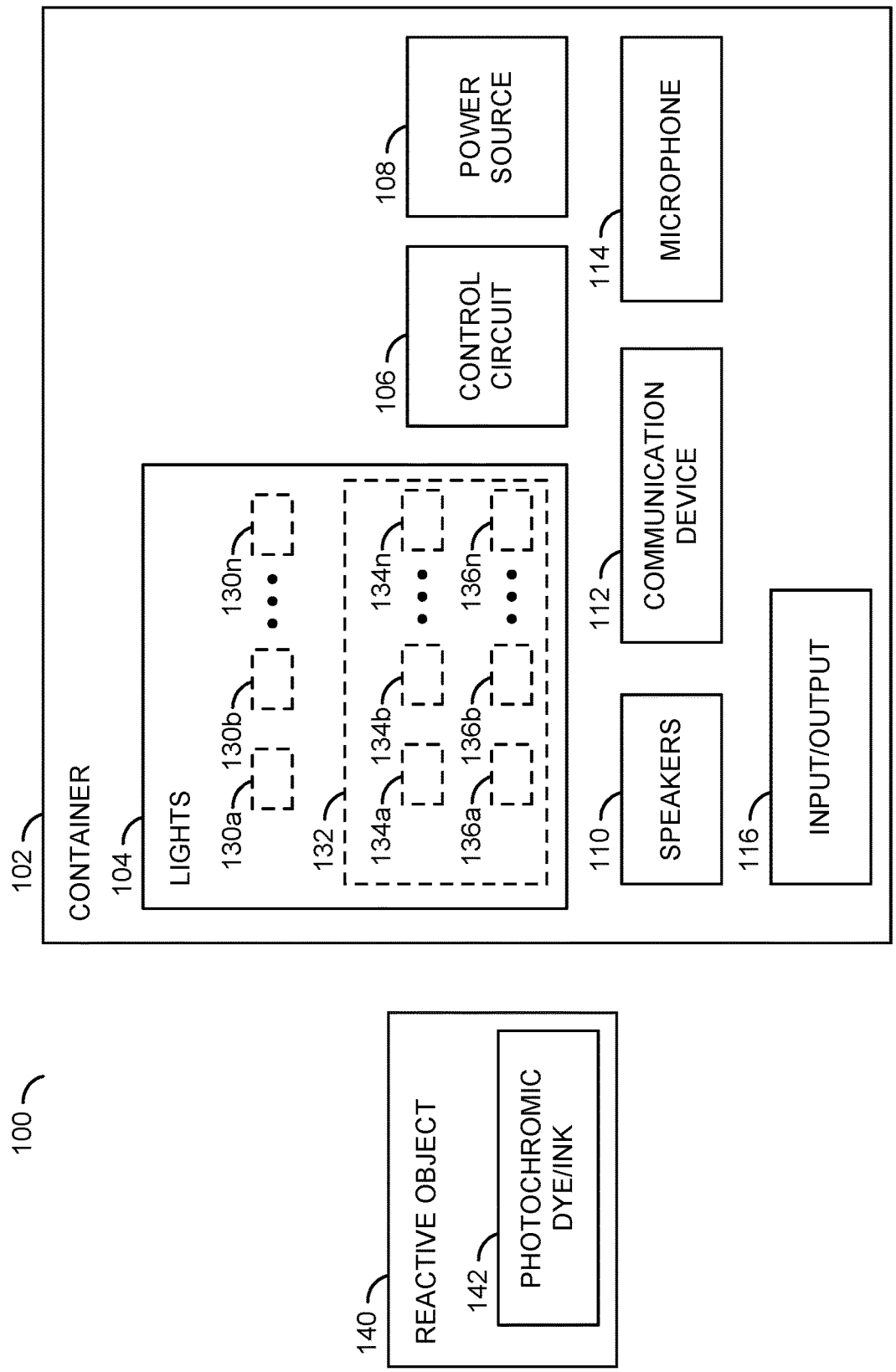
FIG. 1 is a diagram illustrating an example embodiment of the present invention.

Embodiments of the present invention include providing an apparatus for improving accessories that may (i) provide a color-changing dye/ink for various items, (ii) alter a color-changing dye/ink using lighting, (iii) provide a storage container that applies light to an item with color-changing dye/ink, (iv) control lighting characteristics that affect how a reactive material changes appearance, (v) enable user input from a smartphone application, (vi) respond to voice commands, (vii) provide audio feedback, (viii) enable a color and/or pattern change for accessories such as fashion accessories and technology accessories, and/or (ix) be implemented as one or more integrated circuits.

Embodiments of the present invention may be configured to enable an on-demand change of an appearance, design and/or color of an object. The on-demand change of appearance, design and/or color may be enabled using a color changing dye and/or ink. For example, the color changing dye and/or ink may comprise a photochromic material. The photochromic material may be configured to react (e.g., change color) in response to light. The type of object having the color changing dye and/or ink may be any type of object (e.g., a watch, earbuds, a pet collar, a pet harness, eyeglass frames, a guitar, a smartphone case, shoes, shoe laces, toys, figurines, etc.).

In one example, the embodiments of the present invention may be applied to frames that hold prescription and non-prescription lenses. For example, the appearance, design and/or color of eyeglass frames may be changes in response to light. In another example, the embodiments of the present invention may be applied to earbuds. The type of accessories implemented using the embodiments of the present invention may be varied according to the design criteria of a particular invention.

Embodiments of the present invention may be configured to enable a user to change an appearance of an object based of a desire of the user. In one example, the photochromic material may be incorporated into an item (e.g., in the shape of eyeglasses). The reactive material may be configured to change a physical appearance (e.g., a color, a pattern of colors, etc.). The change in appearance may comprise, but is not limited to, creating an object using a structure with photochromic dyes. For example, the photochromic dyes may be added to (e.g., inserted in), painted in/on the object. The object may be constructed to achieve the ability to change appearance in response to light.

The photochromic dyes may be influenced by applying light. Application of light to the photochromic dye may alter a color configuration of the photochromic dye (e.g., reprogram the photochromic dye). The application of light may provide a combination of activation and/or deactivation to the photochromic dye. In an example, particular wavelengths of light may cause an activation and/or deactivation of color channels of the photochromic dye. Selecting the order of application of the wavelengths of light and the particular amount of time that each wavelength of light is applied may enable particular combinations of color to be selected for the photochromic dye. The result of the application of light may produce differentiations in the appearance of the dye.

The differentiation in the dye may comprise a uniform color. For example, the application of light may result in the photochromic dye from changing from one color to another color (e.g., eyeglasses frames may change from a solid red color to a solid black color). The differentiation in the dye may comprise a gradient of color. For example, one section of the object may have a red color, another section may have a blue color, and between the two sections may transition from red to blue. One or both of the two colors of the gradient may be changed by the application of light. The differentiation in dye may comprise a color pattern. For example, the dye may comprise a striped pattern. The application of light may result in the two colors of the striped pattern changing. For example, a tiger stripe pattern (e.g., alternating orange and black stripes) may be changed to a candy cane stripe pattern (e.g., alternating red and white stripes) in response to the application of light. The process of changing color/design may be repeated numerous times to provide the user with multiple options for possible patterns and/or designs (e.g., floral patterns, animal pictures such as dogs or cats, trees or other nature scenes, etc.). The type of pattern and/or the color change of the reactive material in response to the light may be varied according to the design criteria of a particular implementation.

The lighting that affects the color/style of the photochromic dye may be implemented in a container. The container may be a separate item from the object. In one example, the object with the photochromic dye may be a pair of eyeglasses and the container may be an eyeglasses container. The container may work in conjunction with the style changing object. The container may comprise lighting elements configured to interact with the style changing object, a transmitter for communication with an external device (e.g., a smart phone), a power supply (e.g., a battery) and/or a circuit for controlling the lighting. An interior of the container may enable the environment to be controlled in order to provide efficient and/or controlled lighting to the photochromic dye.

The appearance of the style changing object may be changed multiple times. For example, each application of the light may enable the user to change the color and/or appearance of the style changing object. The change of style may be semi-permanent. For example, the style selected in response to the application of light may remain until another application of light is applied. Some change over time may occur (e.g., as sunlight and/or other ambient lighting in the environment is applied over time between the controlled applications of lighting using the container). Generally, the change of style may not be permanent (e.g., the style may be changed as desired by the user). Based on the application of light, the same style may be repeated or a different style may be selected.

Referring to FIG. 1, a diagram illustrating an example embodiment of the present invention is shown. A system 100 is shown. The system may comprise a container 102. The container may comprise a block (or circuit) 104, a block (or circuit) 106, a block (or circuit) 108, a block (or circuit) 110, a block (or circuit) 112, a block (or circuit) 114 and/or a block (or circuit) 116. The circuit 104 may implement lighting elements (e.g., a number of lights). The circuit 106 may implement a control circuit 106. The circuit 108 may implement a power source. The circuit 110 may implement speakers and/or an audio processor. The circuit 112 may implement a communication device. The circuit 114 may implement a microphone 114. The circuit 116 may implement one or more input/output ports. The container 102 may comprise other components (not shown). The number and/or arrangement of the components of the container 102 may be varied according to the design criteria of a particular implementation.

The light elements 104 may comprise a number of lighting elements 130a-130n and colored lighting elements 102. The lighting elements 130a-130n may implement ultraviolet (UV) lights. The colored lighting elements 102 may comprise block (or circuits) 134a-134n and/or blocks (or circuits) 136a-136n. The circuits 134a-134n may implement colored LEDs. The circuits 136a-136n may implement colored LEDs. Generally, the UV lights 130a-130n, the colored LEDs 134a-134n and the colored LEDs 136a-136n may generate light at different wavelengths. The UV lights 130a-130n may generate light in the ultraviolet color spectrum and the colored lights 132 may generate light in the visible color spectrum (e.g., approximately 400 nm-700 nm). In one example, the colored LEDs 134a-134n may comprise blue LEDs and the colored LEDs 136a-136n may comprise red LEDs. In another example, the colored LEDs 134a-134n may comprise green LEDs and the colored LEDs 136a-136n may comprise blue LEDs.

In some embodiments, the light elements 104 may comprise a single type of light emitting element (e.g., multiple light elements of a single type). The single light element may comprise a single diode/cathode/bulb configured to emit a large range of wavelengths (e.g., from approximately 200 nm to 700 nm or more, to cover the UV light spectrum, the visible light spectrum and/or the invisible light spectrum).

Multiple types of light elements may not be necessary (e.g., instead of the UV lights 130a-130n, the colored LEDs 134a-134n and/or the colored LEDs 136a-136n one type of light element may be implemented). The type of light elements implemented and/or the light generated by the UV lights 130a-130n and the colored lights 132 may be varied according to the design criteria of a particular implementation.

A reactive object 140 is shown. The reactive object 140 is shown comprising a photochromic dye/ink 142. The reactive object 140 may be the style changing object. For example, the photochromic dye/ink 142 may be configured to react to characteristics of lighting to change color, style and/or appearance.

In some embodiments, the photochromic dye/ink 142 may be layered. Different color/design effects may be achieved by layering the photochromic ink/dye 142 (e.g., as opposed to mixing different color channels of the photochromic ink/dye 142). In an example, layering may facilitate a solid color change, at the cost of achieving consistent patterns. In another example, mixing may facilitate achieving consistent patterns, at the cost of a complete solid color change. The type of application of the photochromic dye/ink 142 to the reactive object 140 may be varied according to the design criteria of a particular implementation.

Characteristics of the UV lights 130a-130n and/or the colored lights 132 may be controlled by the control circuit 106. The characteristics of the UV lights 130a-130n and/or the colored lights 132 may comprise an intensity of light, a wavelength of light and/or which of the lighting elements 130a-130n are active.

The control circuit 106 may be configured to control the characteristics of the UV lights 130a-130n and/or the colored lights 132. The control circuit 106 may be configured to receive input and generate output. For example, the control circuit 106 may be configured to receive instructions from a user. The instructions may comprise a desired color. The control circuit 106 may be configured to interpret the instructions and determine the characteristics of the UV lights 130a-130n and/or the colored lights 132 to apply in order to achieve the desired color. In one example, the control circuit 106 may be configured to apply the UV lights 130a-130n for a particular amount of time, while the colored lights 132 are deactivated. In another example, the control circuit 106 may be configured to apply a combination of the colored LEDs 134a-134n and the colored LEDs 136a-136n for a particular amount of time while the UV lights 130a-130n are deactivated.

A final resulting appearance of the reactive object 140 and/or the photochromic ink/dye 142 may be changed in response to a modification of the reactive object 140 and/or the photochromic ink/dye 142. In one example, the modification of the reactive object 140 and/or the photochromic ink/dye 142 may comprise one or more of sintering the photochromic dye/ink 142, applying multiple layers (e.g., layers comprising various color channels) of the photochromic dye/ink 142 to the reactive object 140, mixing multiple color channels of the photochromic dye/ink 142 before applying the photochromic dye/ink 142 to the reactive object 140, applying a photochromic coating on the reactive object 140 in addition to the photochromic dye/ink 142 and/or applying a non-photochromic coating on the reactive object 140 in addition to the photochromic dye/ink 142. The types of colors/designs selected for the reactive object 140 may be partially affected by a base color of the reactive object 140 The types of colors/designs selected for the reactive object 140 may be partially affected by exposing the photochromic dye/ink 142 to heat/sintering before application to the reactive object 140. The types of colors/designs selected for the reactive object 140 may be partially affected by the material of the reactive object 140 (e.g., wood, plastic, metal, cardboard, etc.). The types of colors/designs selected for the reactive object 140 may be partially affected by a type of covering (e.g., an additional layer) and/or coating applied on top of the photochromic ink/dye 142 (e.g., a UV coating, glass, acrylic, plastic, waterproofing/weatherproofing materials, etc.). In some embodiments, control circuit 106 may be configured to select the characteristics of the light elements 104 based on the type of material, the type of covering, the base color and/or other attributes of the reactive object 140 and/or the photochromic ink 142.

In some embodiments, the control circuit 106 may comprise a processor and/or a system on chip (SoC). The control circuit 106 may comprise a memory. The control circuit 106 may be configured to receive input and/or generate output for the communication device 112 and/or the I/O devices 116. The control circuit 106 may be configured to receive input from the microphone 114. The control circuit 106 may be configured to provide output to be played by the speakers 110.

In some embodiments, the power source 108 may comprise a battery. The battery 108 may be configured to provide power to the components in the container 102 (e.g., the lights 104, the control circuit 106, etc.). In some embodiments, the power source 108 may comprise voltage regulation circuitry and/or a power converter. For example, the power source 108 may be configured to receive an external power source (e.g., an AC power supply, input from a USB port, etc.) and convert the external power source to be usable by the components of the container 102. Implementing the power source 108 as a battery may enable the container 102 to be portable.

The speakers 110 may be configured to generate audio output. In an example, the audio output may be a notification chime. In one example, the notification chime may provide an indication when a sufficient amount of lighting has been applied for achieving a style change of the reactive object 140. In another example, the notification chime may provide a first indication of when the application of the UV lights 130a-130n has been completed and second indication of when the application of the colored lights 132 has been completed.

The communication device 112 may be configured to enable wireless communication. For example, the communication device 112 may implement Bluetooth communication and/or Wi-Fi communication. The communication device 112 may be configured to communicate to a smartphone. For example, the communication device 112 may be configured to receive instructions (e.g., a desired style and/or color) for altering the appearance of the reactive object 140 from a smartphone. For example, a smartphone application (e.g., a companion application) may provide a user interface to enable the user to select a desired color and/or pattern. The control circuit 106 may be configured to select the characteristics of the light elements 130a-130n in response to the desired color and/or pattern selected.

The microphone 114 may be configured to receive audio. In some embodiments, voice instructions may be received. The voice instructions may comprise a desired color and/or pattern. The control circuit 106 may be configured to select the characteristics of the UV lights 130a-130n and/or the colored lights 132 in response to the desired color and/or pattern selected in response to interpreting the voice instructions. For example, a user may state "change color to red"

and the control circuit 106 may interpret the voice command and select the characteristics of the UV lights 130a-130n and/or the colored lights 132 to change the photochromic dye/ink 142 to a red color.

The input/output components 116 may be configured to send and/or receive data. In one example, the I/O components 116 may be a USB connection. The I/O components 116 may be configured to receive input (e.g., an instruction for changing a style/color of the reactive object 140).

In some embodiments, the I/O components 116 may be configured to provide a power source for the reactive object 140. In an example, the reactive object 140 may be a chargeable item (e.g., wireless headphones, a smartphone, a smartwatch, etc.) that may consume power while in use. The I/O components 116 may be configured to provide power to enable charging of the reactive object 140. In one example, the I/O components 116 may comprise a USB connection that may plug into the reactive object 140 to recharge a battery of the reactive object 140. The I/O components 116 may be configured to recharge the reactive object 140 at any time (e.g., regardless of whether the light components 104 are active or not). In an example, the I/O components 116 may be configured to recharge power to the reactive object 140 while the color/design of the photochromic ink 142 is being activated/deactivated. In another example, the I/O components 116 may be configured to recharge power to the reactive object 140 when the container 102 is used for storage. In an example, the I/O components 116 may supply power to the reactive object 140 for recharging from the power source 108.

Figure 2:
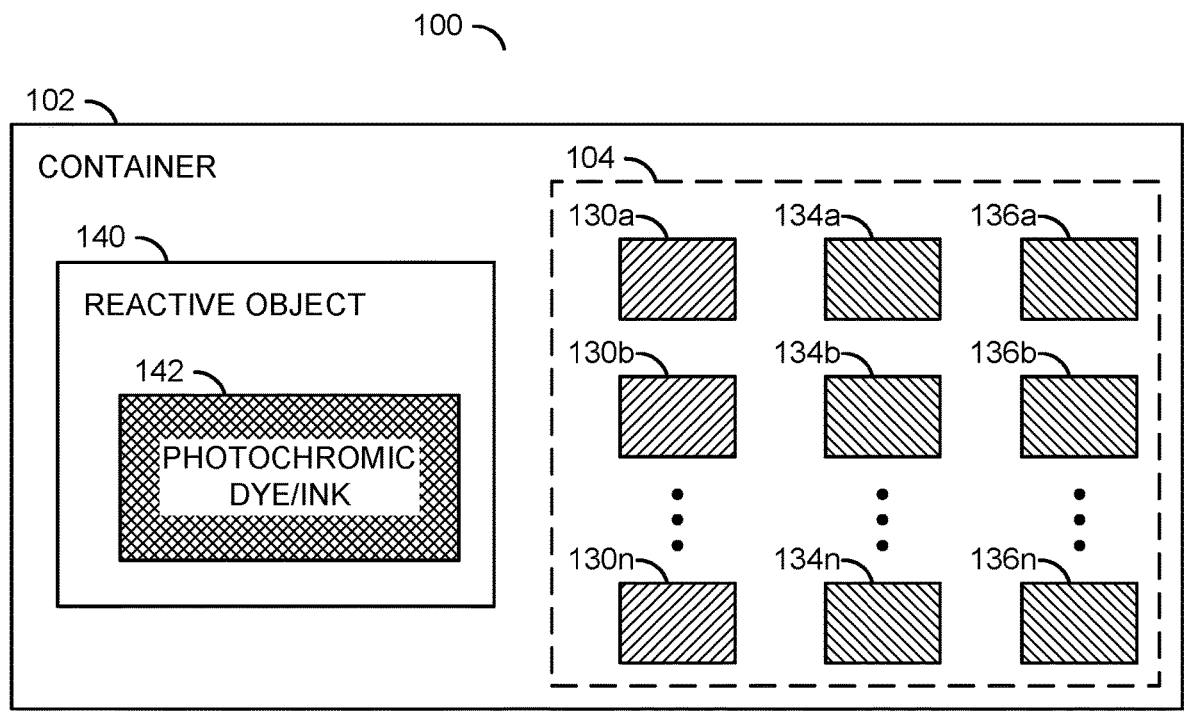
FIG. 2 is a diagram illustrating changing a style of a reactive object by applying light.

Referring to FIG. 2, a diagram illustrating changing a style of a reactive object by applying light is shown. The reactive object 140 is shown within the container 102. The UV lights 130a-130n, the colored LEDs 134a-134n and/or the colored LEDs 136a-136n are shown activated. The UV lights 130a-130n, the colored LEDs 134a-134n and/or the colored LEDs 136a-136n may apply light to the reactive object 140, while the reactive object 140 is within the container 102. In the example shown, all of the UV lights 130a-130n, the colored LEDs 134a-134n and/or the colored LEDs 136a-136n are shown as active for illustrative purposes. Generally, either the UV lights 130a-130n are activate while the colored LEDs 134a-134n and the colored LEDs 136a-136n are inactive or the UV lights 130a-130n are inactive while a combination of the colored LEDs 134a-134n and/or the colored LEDs 136a-136n are active.

The container 102 may provide a controlled environment for the UV lights 130a-130n and the colored lights 132. For example, the container 102 may block external light sources from affecting the characteristics of the UV lights 130a-130n and/or the colored lights 132. By providing a controlled environment, the control circuit 106 may ensure that the selected light characteristics provide the desired color/style for the reactive object 140. In the example shown, the photochromic dye/ink 142 is shown reacting to the activated UV lights 130a-130n and/or the colored lights 132. For example, the UV lights 130a-130n may be applied to the reactive object 140 first, and then the colored lights 132 may be applied to the reactive object 140 next. In an example, the reaction of the photochromic dye/ink 142 may be a change in color.

In some embodiments, the reactive object 140 may be a pair of eyeglasses. For example, the frames of the eyeglasses may be painted and/or contain the photochromic dye 142. In some embodiments, the reactive object 140 may be a smartphone case/cover. In some embodiments, the reactive object 140 may be earphones (or earbuds). In some embodiments, the reactive object 140 may be a watch. The type of object used as the reactive object 140 may be varied according to the design criteria of a particular implementation.

Figure 3:
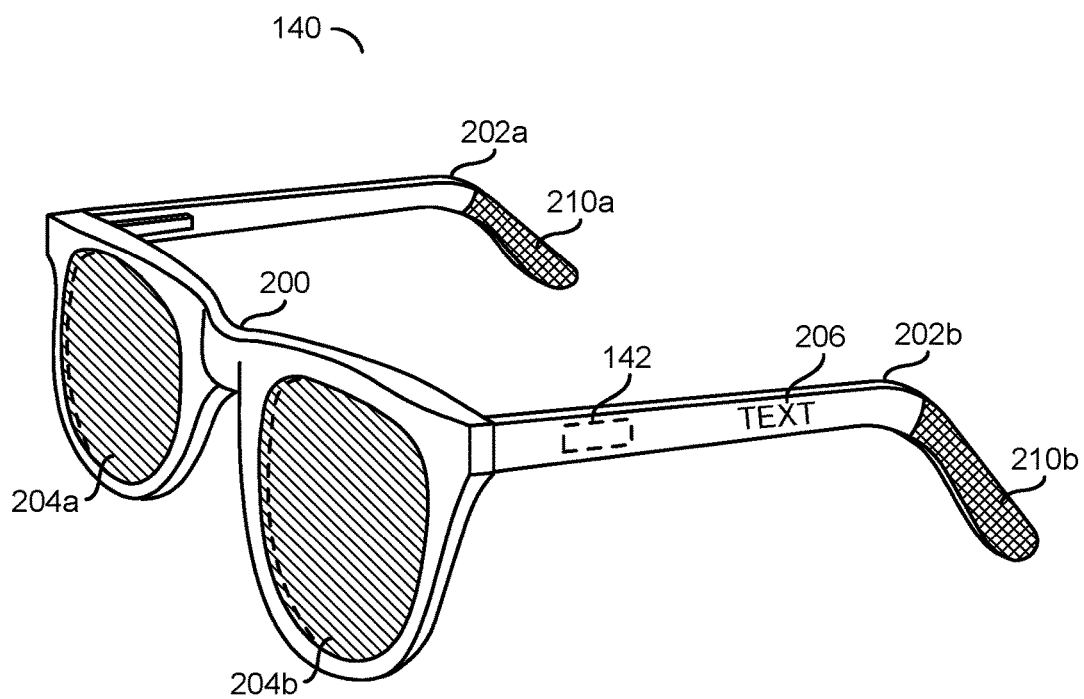
FIG. 3 is a diagram illustrating an example embodiment of the invention implemented as a pair of eyeglasses.

Referring to FIG. 3, a diagram illustrating an example embodiment of the invention implemented as a pair of eyeglasses is shown. The reactive object 140 is shown as a pair of eyeglasses. The eyeglasses 140 may be one example type of object that may be a reactive object.

The eyeglasses 140 may comprise a frame 200, arms (or temple parts) 202a-202b and/or lenses 204a-204b. The frame 200 may be a material forming a structure that encircles and/or supports the lenses 204a-204b. The frames 200 may generally be the portion of the eye apparatus 140 that may be most prominently seen. The temple parts 202a-202b may be configured to secure the eyewear apparatus 140 to the user. The lenses 204a-204b may be prescription (e.g., corrective) or non-prescription lenses (e.g., tinted sunglasses).

The reactive material 142 is shown. In the example shown, the reactive material 142 is shown as a dotted box on the temple part 202b. In one example, the reactive material 142 may be painted onto the eyeglasses 140. For example, a surface of the temple parts 202a-202b and the frames 200 may be painted using the reactive material 142. Generally, the frames 200 may be where a variation of appearance resulting from the application of light to the dye/ink 142 may appear most prominently. For example, the glasses 140 may be created with the dye/ink 142 painted on the frames 200.

In some embodiments, the dye/ink 142 may be a liquid ink. In an example, the frames 200 and/or the temple parts 202a-202b may be a clear plastic material and the dye/ink 142 may be a liquid contained within the plastic material. In another example, the dye/ink 142 may be infused or concealed within the frames 200 (e.g., a change in appearance may be triggered using lights or possibly an electrical pulse).

Text 206 is shown on the arm 202b. Similar text to the text 206 may be on the arm 202a (not visible from the perspective shown). The text 206 may comprise a different material and/or a different coating than the rest of the frames 200 and/or the arms 202a-202b. The different material and/or coating (e.g., a UV resistant coating) may enable the text 206 to be visible in a different color than the color of the frames 200 and/or the arms 202a-202b. For example, the material and/or coating of the text 206 may react differently to the same application and/or time of application to the UV lights 130a-130n and/or the colored lights 132 than the frames 200 and/or the arms 202a-202b.

In one example, the text 206 may be highlighted when a different color is applied to the text 206 than the frames 200 and/or the arms 202a-202b. In another example, the text 206 may be hidden when the same color is applied to the text 206 as the frames 200 and/or the arms 202a-202b. In the example shown, the text 206 may comprise letters. In another example, the text 206 may comprise numbers (e.g., a number worn by a player on a sports team). In some embodiments, the text 206 may comprise a logo and/or other type of image. The type of design used for the text 206 may be varied according to the design criteria of a particular implementation.

The text 206 may enable a form of gamification for the wearer. When the reactive object 140 is removed from the container 102 after the light has been applied, the text 206 may be hidden (e.g., the same color as the rest of the frames 200 and/or the arms 202a-202b). Over time, the color for the text 206 may fade at a faster or slower rate than the color for the frames 200 and/or the arms 202a-202b, which may enable the text 206 to be revealed slowly over time. For example, the text 206 may be used as a secret message that is revealed over time.

Sleeves 210a-210b are shown on the respective arms 202a-202b. In some embodiments, the sleeves 210a-210b may be added to the eyeglasses 140 (e.g., to improve functionality or design). The sleeves 210a-210b may also be created using the photochromic dye/ink 142. For example, the sleeves 210a-210b may enable the frames 200 and/or temple parts 202a-202b to have one type of design and the sleeves may have an alternate design. In the example shown, the sleeves 210a-210b may cover a portion of the arms 202a-202b and the arms 202a-202b are shown having one design and the sleeves 210a-210b are shown having a different design. For example, the sleeves 210a-210b may comprise a different composition of the dye/ink 142 and/or a different coating (e.g., a partial UV coating) than the arms 202a-202b to enable different designs when exposed to the same amount and time of the UV lights 130a-130n and the colored lights 132 while in the container 102.

In some embodiments, the ability to change the style/design of the eyeglasses 140 may be implemented by placing the eyeglasses 140 within the container 102. In some embodiments, the ability to change the style/design of the eyeglasses 140 may be implemented by using a prism configured to channel light emitted by an LED from a smartphone.

One style of eyeglasses 140 is shown as an illustrative example. Various alterations may be made to the eyeglasses 140. Alterations may comprise, but are not limiting to, adjusting the size of the eye apparatus 140 to fit user preference as well as minimal altercations that may increase affordability and performance without changing the inherent function of the eye apparatus 140.

Figure 4:
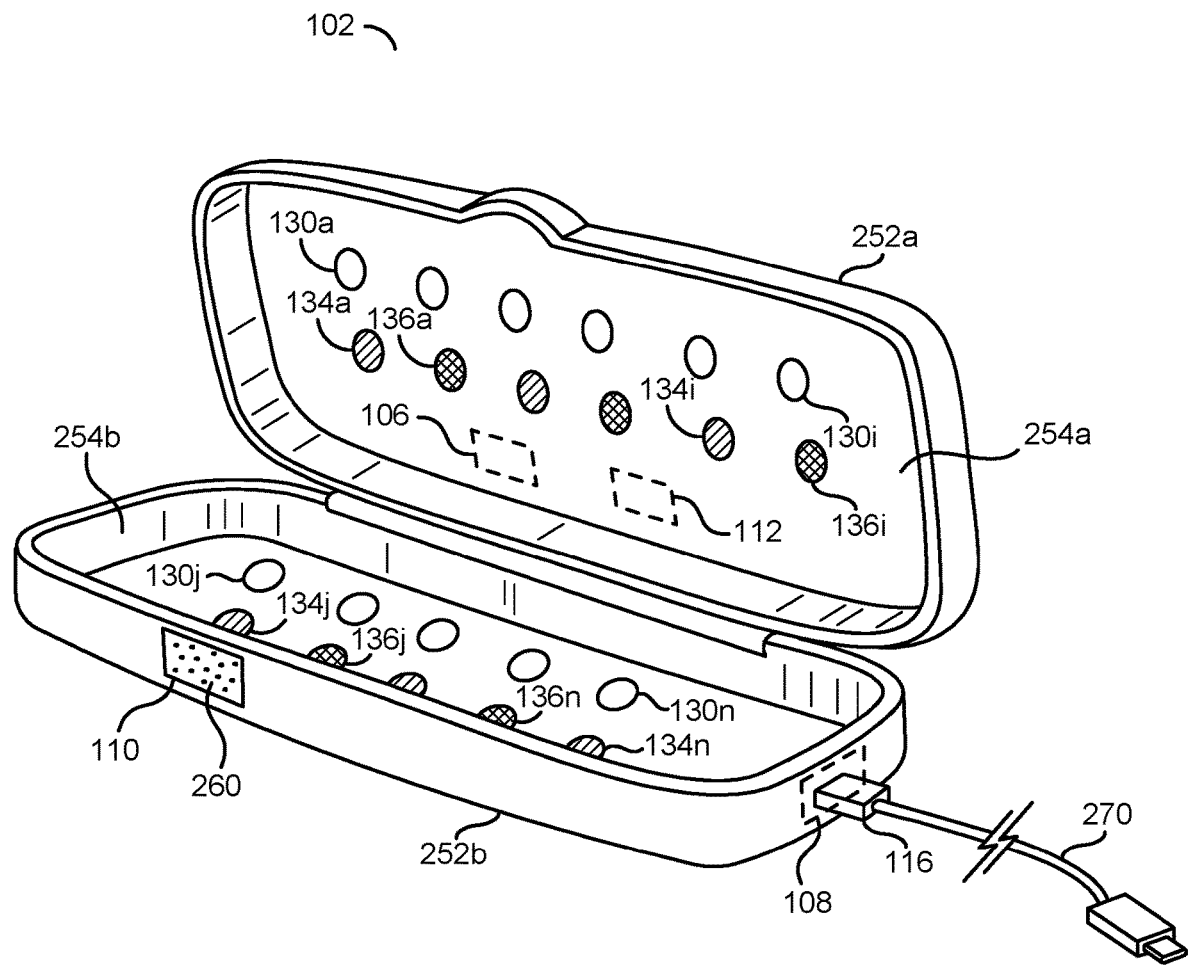
FIG. 4 is a diagram illustrating an example embodiment of a container implementing lights configured to alter the appearance of an inserted item.

Referring to FIG. 4, a diagram illustrating an example embodiment of a container implementing lights configured to alter the appearance of an inserted item is shown. The container 102 is shown. The container 102 is shown open with no object inside. In the example shown, the container 102 may be implemented as a clamshell design.

The container 102 may comprise an outer shell 252a-252b. The outer shell 252a may be a top portion of the clamshell design and the outer shell 252b may be a bottom portion of the clamshell design. The outer shell 252a-252b may open and close and may be made of material that provides protection to the contents inside of the container 102.

The container 102 may comprise an inner surface 254a-254b. The reactive object 140 may rest on the inner surface 254a-254b. Generally, the inner surface 254a-254b may comprise a material that may prevent the reactive object 140 from being damaged when within the container 102 (e.g., padding to prevent scratches to the lenses 204a-204b). For example, the material of the inner surface 254a-254b may be glass, fabric, mirrors, more lights, etc.

The UV lights 130a-130n are shown on the inner surface 254a-254b. The colored LEDs 134a-134n and the colored LEDs 136a-136n are shown on the inner surface 254a-254b. In the example shown, the UV lights 130a-130n are shown as a separate strip of lights from the colored LEDs 134a-134n and the colored LEDs 136a-136n. In the example shown, the colored LEDs 134a-134n and the colored LEDs 136a-136n are shown in the same strip of lights in an alternating pattern. In the example shown, the UV lights 130a-130n and the colored LEDs 134a-134n and the colored LEDs 136a-136n are shown as a number of round lighting elements. In another example, the UV lights 130a-130n and the colored lights 132 may be part of the same strip of lights (e.g., in an alternating pattern). In yet another example, each of the UV lights 130a-130n, the colored LEDs 134a-134n and the colored LEDs 136a-136n may each have a separate strip of lights. While two strips of lights are shown, multiple (e.g., 3-10) strips of lights may be implemented. In an example, the UV lights 130a-130n, the colored LEDs 134a-134n and the colored LEDs 134a-134n may have a small rectangular shape. The size, shape and/or layout of the UV lights 130a-130n, the colored LEDs 134a-134n and/or the colored LEDs 136a-136n may be varied according to the design criteria of a particular implementation.

The UV lights 130a-130n and/or the colored lights 132 may be within the container 102 to emit light onto the reactive object 140 when the reactive object 140 is inside the container 102. Some of the light elements (e.g., the UV lights 130a-130i, the colored LEDs 134a-134i and/or the colored LEDs 136a-136i) are on the top portion of the inner surface 254a and some of the light elements (e.g., the UV lights 130j-130n, the colored LEDs 134j-134n and/or the colored LEDs 136j-136n) are on the bottom portion of the inner surface 254b. The UV lights 130a-130n and/or the colored lights 132 may be located throughout the inner surface 254a-254b to ensure that light may be applied to all surfaces of the reactive object 140 (e.g., to apply even lighting and/or a consistent application of the light characteristics).

The UV lights 130a-130n, the colored LEDs 134a-134n and/or the colored LEDs 136a-136n may comprise LED lighting elements. The LED UV lights 130a-130n, the colored LEDs 134a-134n and/or the colored LEDs 136a-136n may be configured to emit light at a wavelength that may be controllable by the control circuit 106. In an example, the colored LEDs 134a-134n and/or the colored LEDs 136a-136n may comprise RGB elements and the input to the colored LEDs 134a-134n and/or the colored LEDs 136a-136n may be configured to select a particular color output. For example, the color output of the colored LEDs 134a-134n and/or the colored LEDs 136a-136n may be one of the characteristics that affects the change in appearance of the reactive material 142. In one example, one or more of the colored lights 132 may be common cathode LEDs. In another example, one or more of the colored lights 132 may be common anode LEDs.

In some embodiments, the UV lights 130a-130n, the colored LEDs 134a-134n and/or the colored LEDs 136a-136n may comprise a LED driver circuit configured to receive an input from the control circuit 106. The LED driver circuit may be configured to generate a particular light characteristic for the UV lights 130a-130n, the colored LEDs 134a-134n and/or the colored LEDs 136a-136n in response to an input from the control circuit 106. For example, the LED driver circuit may be configured to convert an instruction from the control circuit 106 into electrical signals usable by the UV lights 130a-130n, the colored LEDs 134a-134n and/or the colored LEDs 136a-136n for applying the various characteristics (e.g., a color (e.g., an intensity of red light, blue light and/or green light), a wavelength, an saturation, a brightness and/or a frequency) of the LED elements 130a-130n.

In some embodiments, the UV lights 130a-130n may be configured to emit ultraviolet (UV) light. In some embodiments, the UV lights 130a-130n may be configured to emit infrared (IR) light. For example, the characteristics of the light emitted by the UV lights 130a-130n, the colored LEDs 134a-134n and/or the colored LEDs 136a-136n may comprise a combination of RGB lighting, UV light and/or IR light. The technology and/or type of lighting implemented as the UV lights 130a-130n, the colored LEDs 134a-134n and/or the colored LEDs 136a-136n may be varied according to the design criteria of a particular implementation.

Various hardware components are shown as part of the container 102. Generally, the hardware components (e.g., the control circuit 106, the wireless communication device 112, the power supply 108, the speaker 110) may be located in the container 102 between the outer shell 252a-252b and the inner surface 254a-254b.

A speaker grille 260 is shown on the outer shell portion 252b. The speaker grille 260 may enable audio played by the speaker 110 to be emitted clearly. For example, the speaker 110 may play a chime when the application of light to the reactive object 140 has been completed.

A cable 270 is shown connected to an I/O port 116. The I/O port 116 may be configured to receive data and/or power from the cable 270. In an example, the cable 270 may be a USB cable. The I/O port 116 may be configured to transmit power from the cable 270 to the power source 108. For example, the container 102 may be powered using an external power supply (e.g., by plugging in the USB cable 270 and/or via wireless charging).

In the example shown, the cable 270 is shown extending outside of the container 102. In some embodiments, the cable 270 and/or the I/O port 116 may be within the container 102. For example, the I/O port 116 may be implemented on the inner surface 254a-254b. Implementing the I/O port 116 on the inner surface 254a-254b may enable the battery 108 to recharge the power of the reactive object 140.

The container 102 may be configured to act as an asset to the reactive object 140. For example, the container 102 may be configured to store the reactive object 140. In some embodiments, the container 102 may be configured to charge the reactive object 140 (e.g., rechargeable earbuds, smart glasses, smart watches, etc.). In another example, the container 102 may be equipped with technology to aid the reactive object 140 (e.g., enable changing of the color/style). In the example shown, the container 102 may be an eyeglasses case. In another example, the container 102 may be a case for headphones/earbuds. In yet another example, the container 102 may be a case for a watch. In still another example, the container 102 may be a case for a guitar. The size of the container 102 may be made to be appropriate for the size of the reactive object 140 (e.g., earbuds may have a smaller size of the container 102 than eyeglasses, and a guitar may have a much larger size of the container 102 than eyeglasses). The size and/or shape of the container 102 may be varied according to the design criteria of a particular implementation.

Figure 5:
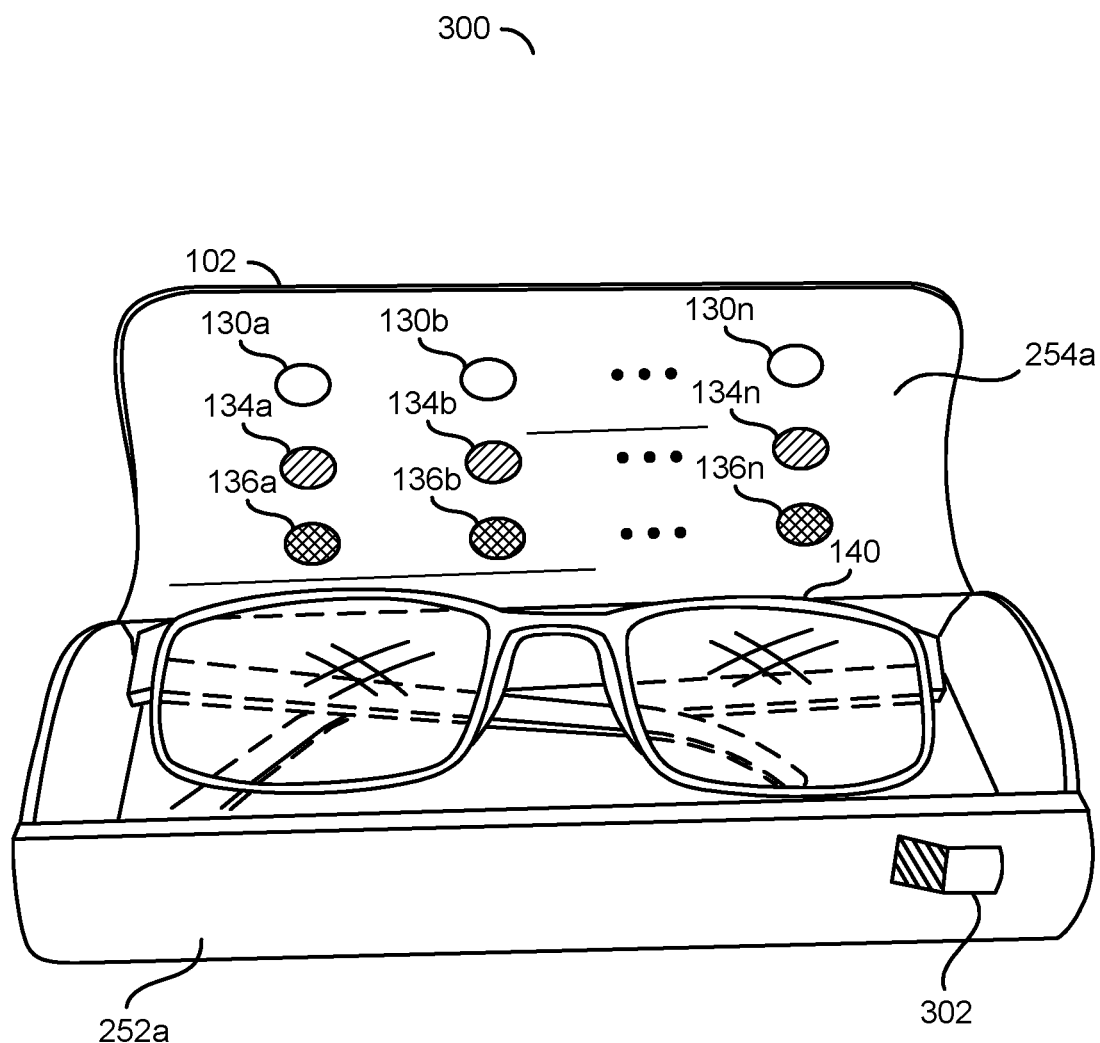
FIG. 5 is a diagram illustrating an example embodiment of the container implementing lights configured to alter the appearance of eyeglasses and provide storage for the eyeglasses.

Referring to FIG. 5, a diagram illustrating an example embodiment of the container implementing lights configured to alter the appearance of eyeglasses and provide storage for the eyeglasses is shown. An example embodiment 300 is shown. The example embodiment 300 may comprise the eyeglasses 140 inside the case 102. For example, the portion of the case 102 comprising the inner surface 254a may be closed over top of the eyeglasses 140. The UV lights 130a-130n, the colored LEDs 134a-134n and/or the colored LEDs 136a-136n may be activated by the control circuit 106. The light may be applied to the eyeglasses 140 to change the appearance of the photochromic material 142.

A physical switch 302 is shown on the container 102. The switch 302 may be configured to activate and/or control characteristics of the light elements 104. In some embodiments, the wireless communication device 112 may be configured to receive instructions from a smartphone app to control the activation of the light elements 104. In some embodiments, the microphone 114 may be configured to receive a voice command from a user to activate and/or control the characteristics of the light elements 104. The container 102 may be configured to apply the light to the photochromic dye/ink 142 to change the appearance of the eyeglasses 140 (e.g., or headphones or other object).

The speaker 110 may be configured to provide a notification that the process of changing the color of the reactive object 140 has been completed. In one example, the speaker 110 may generate a buzz or chime sound. In another example, the speaker 110 may provide a recording of a spoken voice to indicate how the appearance of the reactive object 140 has changed (e.g., a voice may state "purple glasses are now ready" in response to the light characteristics changing the reactive object 140 to a purple color.

The user may decide when to place the eyeglasses 140 into the container 102. For example, the user may keep a particular design/style long-term by not re-applying the light. The container 102 may be used as a protective case and/or for recharging the reactive object 140 (e.g., rechargeable earbuds, a smartphone, a smartwatch, etc.) without applying the lighting (e.g., to keep the same style/design).

In some embodiments, the control circuit 106 may be configured to select different characteristics for the light elements 104 at different locations within the container 102. Selecting different characteristics at different locations within the container 102 may enable applying different patterns/textures/colors on the reactive object 140 at different portions of the reactive object 140. A fine granularity of the selection of the characteristics of the light elements 104 may enable detailed textures to be applied to the reactive object 140. The granularity and/or resolution of the selection of the characteristics of the light emitted by different light elements 104 at different locations within the container 102 may be varied according to the design criteria of a particular implementation.

Figure 6:
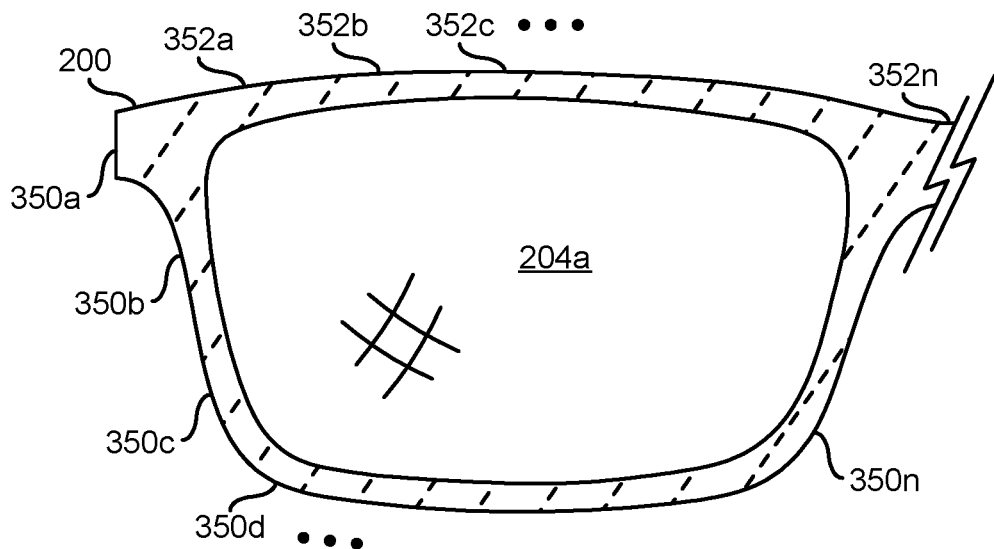
FIG. 6 is a diagram illustrating an example embodiment of a reactive object painted with a pattern using a photochromic dye.

Referring to FIG. 6, a diagram illustrating an example embodiment of a reactive object painted with a pattern using a photochromic dye is shown. A portion of the eyeglasses 140 are shown with the frame 200 and the lens 204a. The eyeglasses 140 may be painted using the photochromic dye/ink 142.

In the example shown, the frames 200 may be painted with a stripe pattern. The stripe pattern may comprise alternating sections 350a-350n and sections 352a-352n. For example, the sections 350a-350n may be painted with different types of photochromic dye/ink 142 than the sections 352a-352n. In another example, the sections 350a-350n may have a coating applied (e.g., a coating that resists the absorption of UV light), while the sections 352a-352n may not have the coating applied. The photochromic dye/ink 142 used for the sections 350a-350n may react differently than the photochromic dye/ink 142 used for the sections 352a-352n when the same characteristics of light are applied.

In the example shown, the light may not yet have been applied to the sections 350a-350n and 352a-352n. While a striped pattern is shown, the type of pattern used (e.g., vertical stripes, horizontal stripes, swirls, etc.) may be varied according to the design criteria of a particular implementation.

Figure 7:
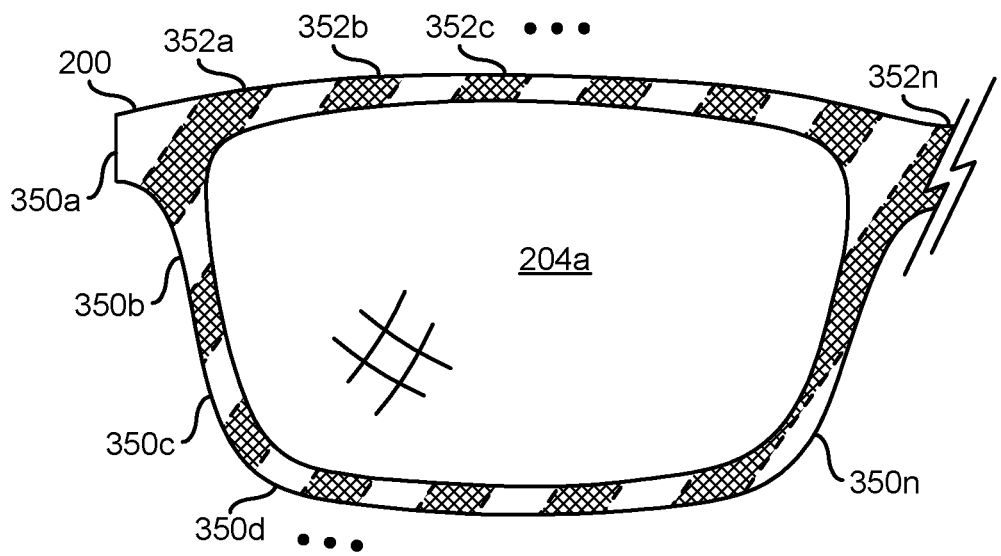
FIG. 7 is a diagram illustrating an example embodiment of a reactive object with an altered style in response to applying light.

Referring to FIG. 7, a diagram illustrating an example embodiment of a reactive object with an altered style in response to applying light is shown. The same portion of the eyeglasses 140 is shown as described in association with FIG. 6. The portion of the frames 200 and the lens 204a are shown. The alternating sections 350a-350n and 352a-352n are shown.

In the example shown, the light may have been applied using the light elements 104. Since different photochromic dye/ink 142 may be applied to the sections 350a-350n compared to the sections 352a-352n, the style/color, after applying the light from a combination of the light elements 104, the sections 350a-350n and the sections 352a-352n may have a different appearance. In the example shown, the sections 350a-350n may appear unshaded and the sections 352a-352n may appear unshaded. For example, the sections 350a-350n may have a white color and the sections 352a-352n may have a black color (e.g., a zebra-stripe pattern). In another example, the sections 350a-350n may have a red color and the sections 352a-352n may have a blue color. In another example, the sections 350a-350n and the sections 352a-352n may both result in the same color (e.g., a solid color pattern). The types of colors resulting from the application of light may be varied according to the design criteria of a particular implementation.

The application of the light to the photochromic dye/ink 142 may result in an alteration of appearance of the reactive object 140. The application of light from the light elements 104 may result in a change in color. The application of light from the light elements 104 may result in a change in design. The photochromic dye/ink 142 may respond to light waves generated by the UV lights 130a-130n, the colored LEDs 134a-134n and/or the colored LEDs 136a-136n in order to change appearance. The control circuit 106 may be configured to manipulate the wavelength of the light output by the light elements 104. In some embodiments, the light elements 104 may alter the characteristics of the light emitted within the container 102 in response to electronic instructions.

The reactive object 140 may change in appearance in response to being placed into the container 102 to receive the light waves generated by the light elements 104. In some embodiments, the physical switch 302 may be used to initiate the change in color (e.g., activate the UV 130a-130n and then a combination of the colored LEDs 134a-134n and/or the colored LEDs 136a-136n). In some embodiments, the change in color (e.g., activation of the light elements 104 and/or the selection of the characteristics of the light elements 104) may be specified using a smart device (e.g., inputting instructions using an app, connecting to a smart home device such as an Alexa/Nest/Siri). The container 102 may be configured to provide on-demand changes to the reactive object 140.

Figure 8:
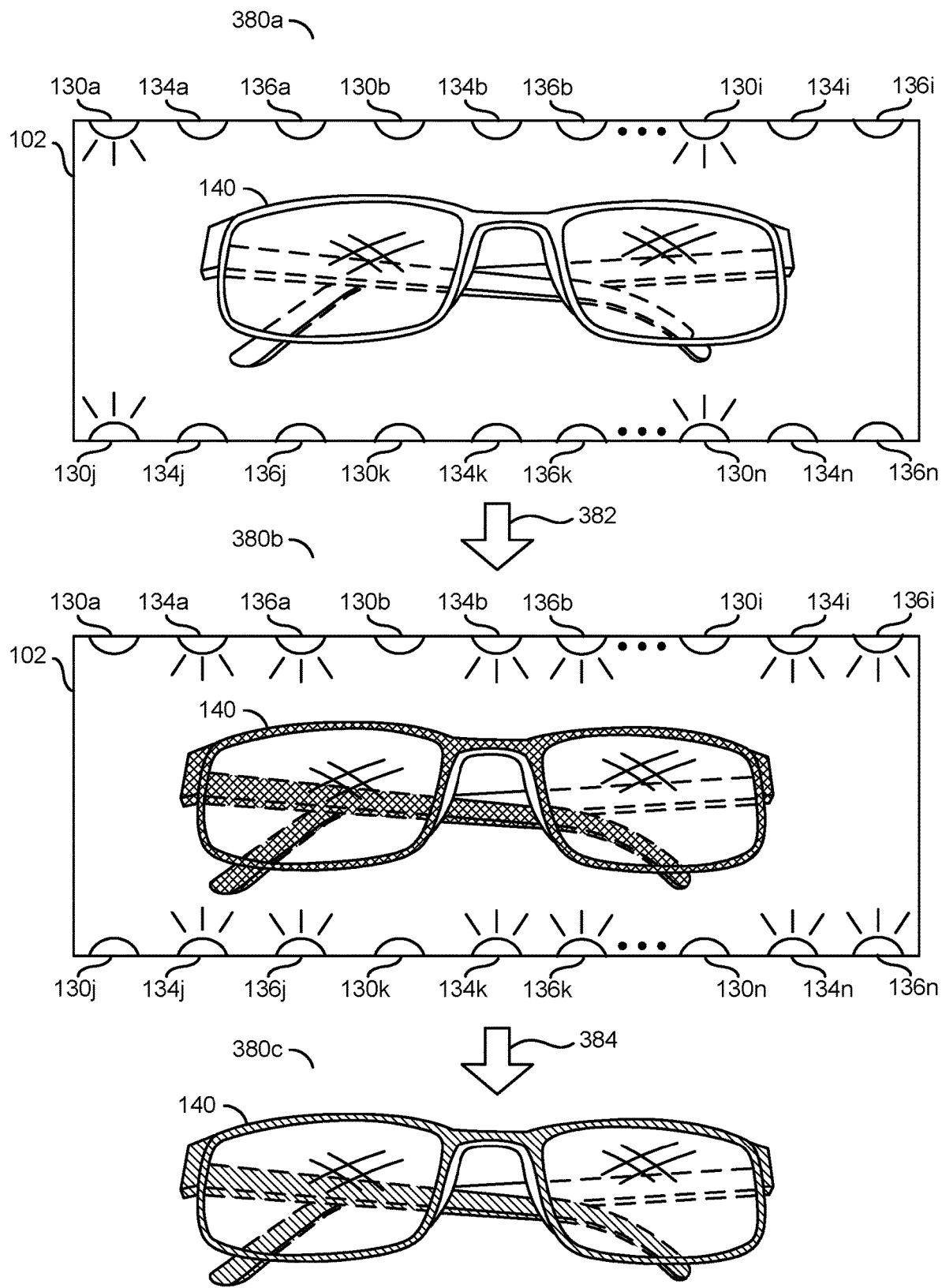
FIG. 8 is a diagram illustrating activating color channels and deactivating color channels of a reactive object by applying various types of light.

Referring to FIG. 8, a diagram illustrating activating color channels and deactivating color channels of a reactive object by applying various types of light is shown. A sequence of time and/or steps 380a-380c is shown. The sequence of time 380a-380c may comprise applying a design (e.g., a color change) to the reactive object 140. In the example shown, the reactive object 140 may comprise a pair of eyeglasses. Similarly, the sequence of time/steps 380a-380c may apply to the application of color to other types of reactive objects (e.g., a watch, a guitar body, earbuds, etc.). The amount of time of exposure for different types of objects may be different.

Generally, the sequence of events shown in the sequence of time 380a-380c may be similar for various types of objects. In one example, the sequence of time 380a-380c may be approximately five minutes long (e.g., approximately two and a half minutes in the first step 380a and approximately two and a half minutes in the second step 380b). In another example, the sequence of time may be six minutes long (e.g., one minute in the first step 380a and five minutes in the second step 380b). In yet another example, the sequence of time may be sixty seconds for glasses and/or earbuds. The amount of time in any of the steps of the sequence of time 380a-380c may be selected dependent on the color selected by the user and/or the type of reactive object 140. The control circuit 106 may be configured to determine the length of time for each step of the sequence of time 380a-380c in response to the color selected by the user and/or various attributes of the reactive object 140 (e.g., material, additional layers on top of the photochromic ink 142, the mixture and/or layers of the photochromic ink 142, etc.). The amount of time for the sequence of time 380a-380c may be varied according to the design criteria of a particular implementation.

The step 380a may be a first step when applying a color and/or design to the reactive object 140. The reactive object 140 may be enclosed within the container 102. The UV lights 130a-130n, the colored LEDs 134a-134n and the colored LEDs 136a-136n are shown in the container 102 with the reactive object 140. In the example shown, the no shading/hatching is illustrated on the reactive object 140 to represent that the reactive object is not colored (or the color has faded).

To apply the color to the reactive object 140, the photochromic ink 142 may be activated (e.g., initialized, charged or primed). The reactive object 140 may be primed by applying light in the ultraviolet spectrum of light. In the container 102, the UV lights 130a-130n are shown activated. In the container 102, the colored LEDs 134a-134n and the colored LEDs 136a-136n may be deactivated. Activating the UV lights 130a-130n and deactivating the colored lights 132 may enable the light in the ultraviolet spectrum to be applied to the reactive object 140. The UV light emitted by the UV lights 130a-130n may prime the photochromic ink 142. The photochromic ink 142 may comprise a mixture of various types of photochromic dyes. In one example, the photochromic ink 142 may comprise a mixture of all color channels. In another example, the photochromic ink 142 may comprise a combination of one or more of the color channels (e.g., a mixture of two types of dyes). Limiting the number of photochromic dyes in the photochromic ink 142 applied to the reactive object 140 may reduce a number of final result colors available but increase an amount of control of the final result color compared to the photochromic ink 142 comprising a mixture of all the color channels. The composition of the photochromic ink 142 may be varied according to the design criteria of a particular implementation.

Priming the photochromic ink 142 may comprise transforming the photochromic ink 142 from a transparent state to a colored state by absorbing the UV light generated by the UV lights 130a-130n. For example, the photochromic ink 142 may comprise a mixture of a cyan, magenta and yellow color (e.g., three different color channels) mixed together into a single solution. When the cyan, magenta, and yellow photochromic colors channels are mixed together into a single solution and the solution is activated with the UV light generated by the UV lights 130a-130n all three color channels may become fully saturated. When the color channels are fully saturated, the photochromic ink 142 may have a 'true color' (e.g., a black color when a properly mixed combination of all the color channels for the photochromic ink 142 is applied, but the true color may vary).

In the example shown, the reactive object 140 may currently be shown having the photochromic ink 142 in the transparent state (e.g., all color channels deactivated). In some embodiments, the reactive object 140 may have a base color (e.g., white or a non-white color when all color channels are deactivated). The base color may be implemented to aid the look of the final output color. For example, particular base colors may improve an appearance of the final result of the photochromic ink 142 (e.g., similar to how a base coat of paint or a primer improves how a paint color looks when applied). In the step 380a, the UV lights 130a-130n may activate (e.g., prime) the photochromic ink 142. In one example, in the step 380a the UV lights 130a-130n may be active for approximately 2-3 minutes.

An arrow 382 is shown. The arrow 382 may represent the passage of time for the step 380a (e.g., 1 minutes, 5 minutes, 10 minutes, etc.). After the step 380a, the next step in the sequence of time 380a-380c may be the step 380b. The step 380b may be a second step when applying a color and/or design to the reactive object 140. The reactive object 140 may be enclosed within the container 102. The UV lights 130a-130n, the colored LEDs 134a-134n and the colored LEDs 136a-136n are shown in the container 102 with the reactive object 140. In the example shown, a shading and/or cross-hatching effect is illustrated on the reactive object 140 to represent that the reactive object 140 is activated (e.g., all three color channels of the photochromic ink 142 are fully saturated).

To apply the color to the reactive object 140, after the photochromic ink 142 has been activated (e.g., all of the applied color channels fully activated), particular color channels may be deactivated to result in a desired color. The photochromic ink 142 may be transformed back from the fully colored state to transparent through the absorption of visible light (e.g., deactivation). Color channels of the photochromic ink 142 may be deactivated by applying light in the visible spectrum of light. Complete deactivation of all the color channels may result in the photochromic ink 142 appearing transparent. Partial deactivation of particular color channels of the photochromic ink 142 may result in a particular color and/or pattern (e.g., the desired color/design). In an example, the process of selecting the desired color/design generally comprises full activation of the color channels (e.g., applying the UV light) and then partial deactivation of one or more color channels. Details of the activation and/or deactivation of the photochromic ink 142 may be described in "Photo-Chromeleon: Re-Programmable Multi-Color Textures Using Photochromic Dyes", Yashua et al., In UIST, pp. 701-712. 2019, appropriate portions of which are hereby incorporated by reference.

In the container 102, the UV lights 130a-130n are shown deactivated. In the container 102, the colored LEDs 134a-134n and the colored LEDs 136a-136n may be activated. Deactivating the UV lights 130a-130n and activating the colored lights 132 may enable the light in the visible spectrum or invisible spectrum to be applied to the reactive object 140. The visible light emitted by the colored LEDs 134a-134n and/or the colored LEDs 136a-136n may deactivate the photochromic ink 142.

To enable the photochromic ink 142 to adjust to a color other than black (e.g., the fully activated state), the colored lights 132 may be selected by the control circuit 106 to deactivate one or more color channels. In one example, deactivating the cyan color may result in red color of the photochromic ink 142 (e.g., only yellow and magenta remain activated). Each color channel of the photochromic ink 142 may be deactivated individually by applying a different wavelength of light in the visible spectrum. In the example shown, both the colored LEDs 134a-134n and the colored LEDs 136a-136n are shown activated. However, various combinations of intensity of the colored LEDs 134a-134n and/or the colored LEDs 136a-136n may be selected by the control circuit 106 in order to deactivate the appropriate color channels to adjust the photochromic ink 142 to the color desired by the user. For example, a deactivation peak for each color channel may be at a different wavelength in the visible or invisible light spectrum (e.g., 700 nm-800 nm may not be visible but may affect the photochromic ink/dye 142).

In one example, shining a blue color from the combination of the colored lights 132 may deactivate the yellow color channel. In another example, shining a green color from the combination of the colored lights 132 may deactivate the magenta color channel. In yet another example, shining a red color from the combination of the colored lights 132 may deactivate the cyan color channel. The control circuit 106 may be configured to deactivate the specific color channels of the photochromic ink 152 by projecting RGB lighting from the colored lights 132 to reduce saturation levels in particular color channels in order to select the desired color for the reactive object 140.

In the example shown for the step 380b, the reactive object 140 may currently be shown having the photochromic ink 142 in the fully saturated color state. In the step 380b, the colored lights 132 may deactivate one or more color channels of the photochromic ink 142. In one example, in the step 380b the colored lights 132 may be active for approximately 2-3 minutes.

An arrow 384 is shown. The arrow 384 may represent the passage of time for the step 380b (e.g., 1 minutes, 5 minutes, 10 minutes, etc.). After the step 380b, the next step in the sequence of time 380a-380c may be the step 380c. The step 380c may be the final result after applying a color and/or design to the reactive object 140. In the step 380c, the reactive object 140 may not be within the container 102. For example, the reactive object 140 may be the final result of applying the color/design of the photochromic ink 142 and may be ready to be worn by the user. In the example shown, a shading/hatching effect is illustrated on the reactive object 140 to represent that some of the color channels of the photochromic ink 142 have been deactivated and/or partially deactivated (e.g., the three color channels of the photochromic ink 142 are no longer fully saturated).

Generally, the color/design of the reactive object 140 may appear closest to the desired/selected color shortly after the reactive object 140 has been removed from the container 102 (e.g., after the color channels have been deactivated by the colored lights 132). Over time, the desired color of the reactive object 140 may gradually fade. For example, ambient visible and/or invisible light in the environment may slowly deactivate one or more of the color channels of the photochromic ink 142 (e.g., sunlight, artificial light sources in the environment, etc.). The user may perform the sequence of steps 380a-380c again to re-apply the desired color or select a different color (e.g., activate all the color channels of the photochromic ink 142 using the UV lights 130a-130n and then deactivate specific amounts of particular color channels using a combination of the colored LEDs 134a-134n and/or the colored LEDs 136a-136n).

Figure 9:
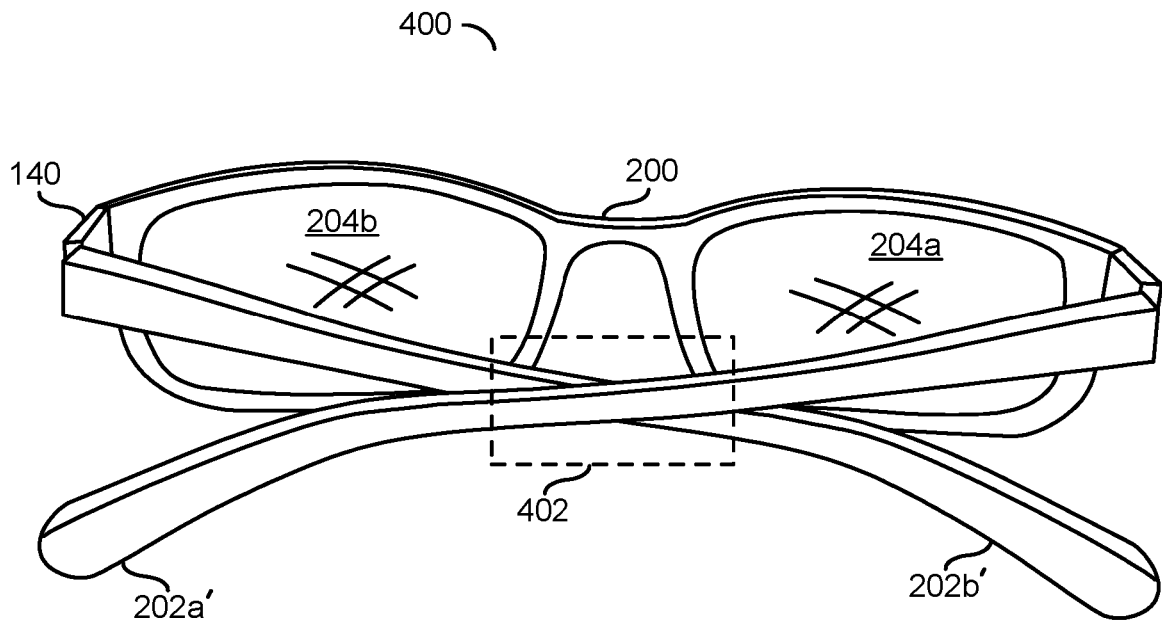
FIG. 9 is a diagram illustrating a modification to arms of eyeglasses for exposing more surface area to light.

Referring to FIG. 9, a diagram illustrating a modification to arms of eyeglasses for exposing more surface area to light is shown. A view 400 of the reactive object 140 is shown. The view 400 may provide an example of the reactive object 140 implemented as a pair of eyeglasses. A rear view of the eyeglasses 140 are shown. The eyeglasses 140 may comprise the frames 200, the arms 202a'-202b' and/or the lenses 204a-204b.

Generally, the temple parts (e.g., arms) of eyeglasses may be designed to fold over top of each other (e.g., the right arm folds over top of the left arm, or the left arm folds over top of the right arm). Folding the temple parts over top of each other enables compact storage of eyeglasses. However, when the temple parts are folded over top of each other, the top arm (e.g., the right arm) may substantially block light from reaching the bottom arm (e.g., the left arm). If the one temple part blocks the light from reaching another temple part, the temple parts may block the UV lights 130a-130n from activating the photochromic ink 142 and/or the colored lights 132 from deactivating color channels of the photochromic ink 142 when the reactive object 140 is in the container 102.

A modified fold 402 is shown. The eyeglasses 140 may implement the modified fold 402 of the arms 202a'-202b'. The modified fold 402 may enable the arms 202a'-202b' to fold to enable a compact state for the eyeglasses 140 so that the eyeglasses may fit within the container 102 (e.g., the container 102 may be implemented to appear similar to a standard case for eyeglasses).

The modified fold 402 may be implemented by angling the arms 202a'-202b' slightly downwards. The slight downwards angle of the arms 202a'-202b' may limit an amount of crossover area of the arms 202a'-202b'. The limited crossover area of the modified fold 402 may enable the UV lights 130a-130n and/or the colored lights 132 to reach the surface of more of the arms 202a'-202b' compared to a conventional fold. By exposing more of the surface area of the arms 202a'-202b' to the UV lights 130a-130n and/or the colored lights 132, the result of the photochromic ink (e.g., after activation and deactivation) may appear consistent (e.g., a relatively even application of light to all surfaces of the eyeglasses 140).

In the example shown, the modified fold 402 may be applicable to the arms 202a'-202b' when the reactive object 140 is implemented as eyeglasses. Other types of reactive objects may have similar overlapping issues that may affect the exposure to the UV lights 130a-130n and/or the colored lights 132 of some portion(s) of the reactive object 140. For example, earbuds may have portions that curl to secure to the ear of the user, which may result in an overlap. Similar types of modifications such as the modified fold 402 may be applied to other types of reactive objects with inherently different shapes (e.g., earbuds, watches, etc.) based on the design criteria of a particular implementation.

In some embodiments, the control circuit 106 may determine an amount of time to apply the light elements 104 for each orientation of the arms 202a'-202b'. The control circuit 106 may generate a sound output to the speakers 110 to indicate when to change the orientation of the arms 202a'-202b'. For example, the control circuit 106 may determine that the UV lights 130a-130n may activate the photochromic ink 142 for two minutes with one orientation (e.g., the right arm 202a' folded over the left arm 202b'), then play the notification from the speaker 110 to indicate to the user to change the orientation of the arms 202a'-202b' (e.g., so that the left arm 202b' is folded over the right arm 202a'), then continue applying the UV lights 130a-130n for another two minutes in the changed orientation. Then the control circuit 106 may apply the colored lights 132 for two minutes and then the notification may be played again so that the user may change the orientation of the arms back to the original orientation (e.g., the right arm 202a' folded over the left arm 202b') and then continue applying the colored lights 132 for another two minutes.

Figure 10:
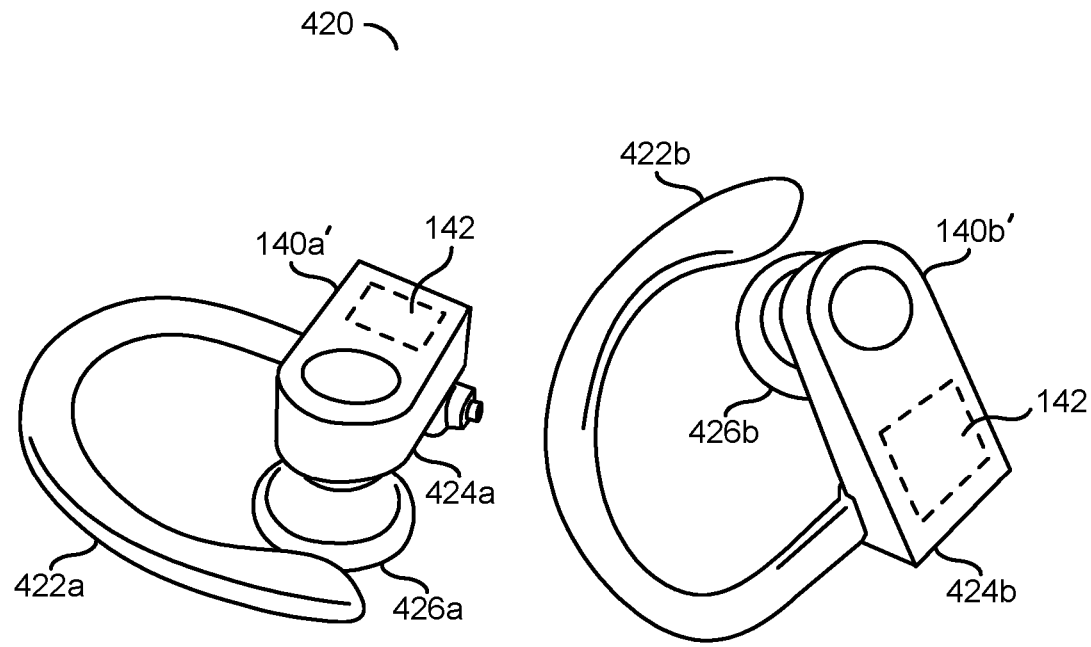
FIG. 10 is a diagram illustrating an embodiment of the present invention in the context of earbuds.

Referring to FIG. 10, a diagram illustrating an embodiment of the present invention in the context of earbuds is shown. An embodiment 420 is shown. The embodiment 420 may comprise reactive components 140a'-140b'. In the example shown, the reactive components 140a'-140b' may be earbuds.

The reactive earbuds 140a'-140b' may comprise respective ear hooks 422a-422b, housings 424a-424b and/or speakers 426a-426b. The ear hooks 422a-422b may support the reactive earbuds 140a'-140b' on the ears of the user. The housings 424a-424b may comprise the electronics for playing audio (e.g., a battery, an audio processor, a Bluetooth communication device, etc.). The speakers 426a-426b may fit into the ears of the users and output the audio.

The housings 424a-424b are shown comprising the photochromic ink 142. In some embodiments, the ear hooks 422a-422b and/or the speakers 426a-426b may also comprise the photochromic ink 142. However, when the reactive earbuds 140a'-140b' are worn, the ear hooks 422a-422b may be hidden from view behind the ears of the user and the speakers 426a-426b may be hidden from view inside the ears of the user (e.g., a color and/or design of the earhooks 422a-422b and/or the speakers 426a-426b may be irrelevant). Generally, the housings 424a-424b are visible when the earbuds 140a'-140b' are worn.

The photochromic ink 142 applied to the housings 424a-424b (and/or other components) of the reactive earbuds 140a'-140b' may enable the user to select the desired color/design. The container 102 may be configured to fit the reactive earbuds 140a'-140b' inside. The UV lights 130a-130n may activate the photochromic ink 142 and then the colored lights 132 may deactivate specific color channels of the photochromic ink 142 (e.g., similar to the example shown in association with FIG. 8).

Reactive earbuds 140a'-140b' may be one example implementation of the system 100. In another example, the system 100 may be implemented with the reactive object 140 implemented as a watch. In yet another example, the system 100 may be implemented with the reactive object 140 implemented as a guitar body. In still another example, the system 100 may be implemented with the reactive object 140 implemented as a helmet (e.g., a bike helmet, a hockey helmet, a football helmet, etc.). In another example, the system 100 may be implemented with the reactive object 140 implemented as various types of sports equipment (e.g., a hockey stick, a ski pole, a skateboard, skis, a snowboard, etc.). In yet another example, the system 100 may be implemented with the reactive object 140 implemented as a drink koozie. The type of the reactive object 140 implemented may be varied according to the design criteria of a particular implementation.

Figure 11:
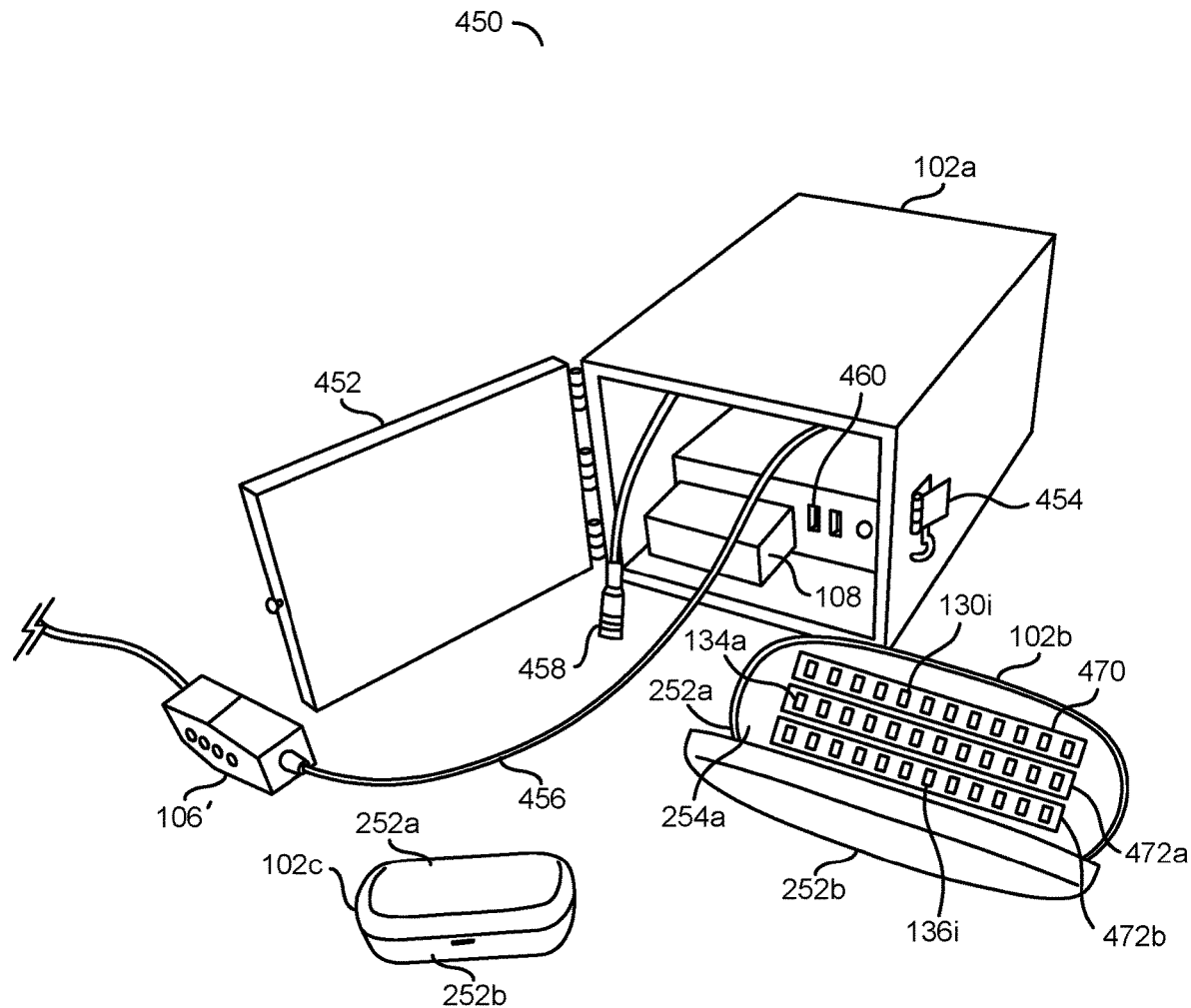
FIG. 11 is a diagram illustrating various sizes of containers.

Referring to FIG. 11, a diagram illustrating various sizes of containers is shown. A view 450 of multiple containers 102a-102c is shown. The containers 102a-102c may represent various embodiments of the container 102 of the system 100. The container 102a may be a relatively larger size. The container 102b may be a container approximately the size of an eyeglasses container (e.g., inches wide, 3 inches deep and 2 inches in height). The container 102c may be a container approximately the size of the reactive earbuds 140a'-140b' (e.g., 3 inches wide, 2 inches deep and 2 inches in height).

The containers 102a-102c may be representative examples of various sizes of containers that may be implemented by the system 100. The containers 102a-102c may be designed according to the size of the various reactive objects 140 that have the photochromic dye/ink 142. For example, a container with a similar size as the container 102c may be used for a watch. In another example, one of the containers 102a-102c may be long and narrow to fit sports equipment (e.g., a ski pole or a hockey stick) implemented with the photochromic dye/ink 142. In yet another example, one of the containers 102a-102c may have the size of a guitar case for a guitar implemented with the photochromic dye/ink 142. The size and/or shape of the container 102 may be varied according to the design criteria of a particular implementation.

The container 102a is shown having a lid 452. A latch 454 may be implemented to secure the lid 452. Securing the lid 452 may enable the light elements 104 to activate and/or deactivate the photochromic ink 142 on the reactive object 140 when the reactive object 140 is within the container 102a without allowing external light sources into the container 102a. The lid 452 may enable the container 102a to be implemented as a box.

The power source 108 is shown within the container 102a. In the example shown, the power source 108 may be a battery and a driver circuit for the light elements 104. The control circuit 106' is shown outside of the container 102a. In the example shown, the control circuit 106' may be a manual switch. For example, the control circuit 106' may provide an interface for enabling the user to manually adjust the light elements 104 (e.g., turn on/off the UV lights 130a-130n and/or the colored lights 132, select a color combination for the colored lights 132, select an intensity of the UV lights 130a-130n and/or the colored lights 132, etc.).

A cable 456 is shown connected to the control circuit 106'. A connector 458 is shown at one end of the cable 456. In one example, the connector 458 may be a USB plug. A port 460 is shown on the power source 108. The port 460 may be part of the input/output 116 of the container 102a. In an example, the port 460 may be a USB port. For example, the connector 458 may connect to the port 460. The connection of the connector 458 to the port 460 may enable the power supply 108 to receive input from the control circuit 106'. In an example, the input received by the control circuit 106' may be sent to the power supply 108 via the cable 456 and the power supply 108 may adjust the light elements 104 in response to the input from the control circuit 106'.

The container 102b is shown having the outer shell 252a-252b. The outer shell 252a-252b may enable the container 102b to be implemented as a clamshell container. The container 102b is shown with the outer shell 252a-252b opened. The inner surface 254a is shown with the outer shell 252a-252b opened.

A light strip 470 is shown on the inner surface 254a. The light strip 470 may comprise the UV lights 130a-130n (only the UV light 130i is labeled for clarity). Light strips 472a-472b are shown on the inner surface 254a. The light strips 472a-472b may comprise the colored lights 132 (only the colored LED 134i and the colored LED 136i are labeled for clarity). The colored LEDs 134a-134n and the colored LEDs 136a-136n may be arranged throughout either one of the light strips 472a-472b. In the example shown, the individual LEDs for the UV lights 130a-130n and/or the colored lights 132 are shown. In some embodiments, the light strip 470 and/or the light strips 472a-472b may be covered with a cover (e.g., to appear as a light bar).

In an example, the power supply 108 may be connected to the light strip 470 and the light strips 472a-472b. The control circuit 106' may receive input to determine which of the light elements 104 to activate. The control circuit 106' may present a signal to the power supply 108 and the driver circuit of the power supply 108 may provide an appropriate amount of power to one or more of the light strip 470 and/or the light strips 472a-472b.

The container 102c is shown having the outer shell 252a-252b. The outer shell 252a-252b may enable the container 102a to be implemented as a clamshell container. The container 102c is shown with the outer shell 252a-252b closed. For example, the reactive earbuds 140a'-140b' may be within the container 102c and the light elements 104 may be applying the light to select the color/design for the photochromic ink 142.

Figure 12:
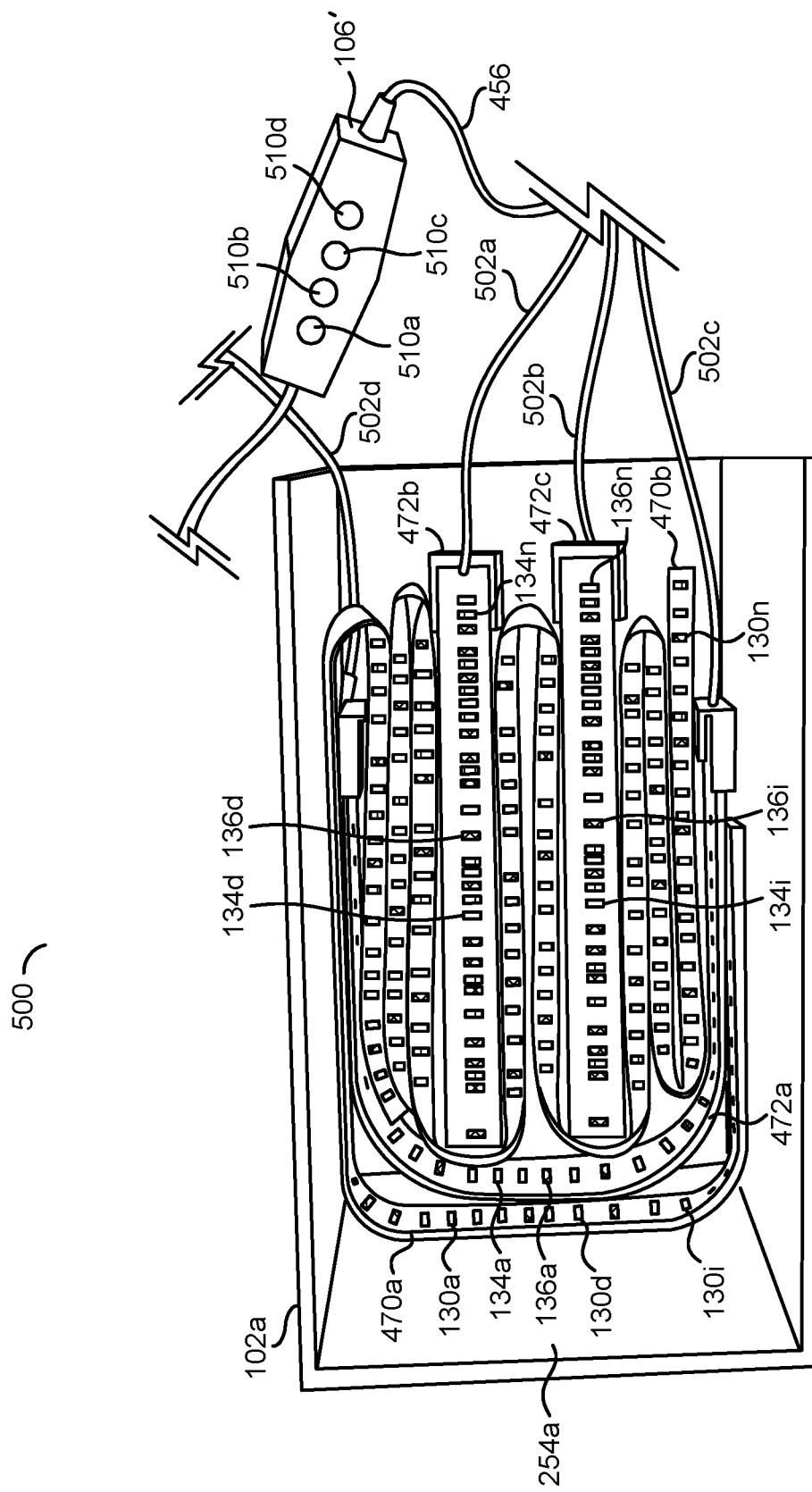
FIG. 12 is a diagram illustrating lights implemented in the interior of a container.

Referring to FIG. 12, a diagram illustrating lights implemented in the interior of a container is shown. A view 500 is shown. The view 500 may comprise an interior view of the container 102a (described in association with FIG. 11). The interior view 500 may comprise the inner surface 254a of the container 102a. The interior view 500 may comprise the light strips 470a-470b and the light strips 472a-472c. The interior view 500 may comprise the manual control circuit 106' and the cable 456. The manual control circuit 106' is shown outside of the container 102.

The light strips 470a-470b are shown routed throughout the inner surface 254a (e.g., on each side of the inner surface). The light strips 470a-470b may comprise the UV lights 130a-130n. Routing the light strips 470a-470b throughout the inner surface 254a may enable the ultraviolet light generated by the UV lights 130a-130n to be applied to the reactive object 140 from various different angles.

The light strips 472a-472c are shown routed throughout the inner surface 254a (e.g., on each side of the inner surface). The light strips 472a-472c may comprise the colored LEDs 134a-134n and/or the colored LEDs 136a-136n. Routing the light strips 472a-472c throughout the inner surface 254a may enable the visible and/or invisible light generated by the colored LEDs 134a-134n and/or the colored LEDs 136a-136n to be applied to the reactive object 140 from various different angles.

The colored LEDs 134a-134n and the colored LEDs 136a-136n are shown on each of the light strips 472a-472c. In one example, the colored LEDs 134a-134n may be arranged to alternate with the colored LEDs 136a-136n (e.g., the colored LED 134a may be next to the colored LED 136a and the colored LED 134b may be next to the colored LED 136a, etc.). In another example, the colored LEDs 134a-134n may be randomly arranged throughout the colored LEDs 136a-136n. Generally, the colored LEDs 134a-134n and the colored LEDs 136a-136n may be arranged to provide visible light coverage to all sides of the reactive object 140 when the colored lights 132 are emitting light. The arrangement of the colored LEDs 134a-134n and the colored LEDs 136a-136n may be varied according to the design criteria of a particular implementation.

A wire 502a is shown connected to the light strip 472b. A wire 502b is shown connected to the light strip 472c. A wire 502c is shown connected to the light strip 472a. A wire 502d is shown connected to the light strip 470a. The wires 502a-502d may be connected to the power supply 108 (not shown). The wires 502a-502d may provide signals to the light strips 470a-470b and/or 472a-472c. For example, the manual control circuit 106' may provide information about the intensity and/or wavelength of the light emission for the lighting elements 104 and the cable 456 may transmit the information to the power supply 108. The power supply 108 may provide input signals to the light strips 470a-470b and/or 472a-472c over the wires 502a-502d to activate, deactivate and/or adjust the light output by the UV lights 130a-130n, the colored LEDs 134a-134n and/or the colored LEDs 136a-136n.

The manual control circuit 106' may comprise buttons 510a-510d. The buttons 510a-510d may enable a user to select the output for the light elements 104. In one example, the buttons 510a-510d may be configured to enable the user to select a color (e.g., red) and the control circuit 106' may determine the appropriate settings for the UV lights 130a-130n and/or the colored lights 132 to alter the photochromic ink 142 to a red color. In another example, the buttons 510a-510d may be configured to enable the user to select an intensity of light, a length of time to emit the light and/or the wavelength of the light generated by the UV lights 130a-130n and/or the colored lights 132 (e.g., the user may select red for five minutes, and the control circuit 106' may deactivate the UV lights 132a-132n and adjust the colored lights 132 to emit a red color, which may result in the cyan color channel of the photochromic ink 142 being deactivated. The type of input received by the manual control circuit 106' and/or the type of output signal generated by the manual control circuit 106' may be varied according to the design criteria of a particular implementation.

In the example shown, the colored lights 132 may comprise two types of colored LEDs (e.g., the colored LEDs 134a-134n and the colored LEDs 136a-136n). The deactivation of color channels of the photochromic ink 142 may react to particular wavelengths of visible light. In some embodiments, three types of colored LEDs may be implemented (e.g., red, green and blue lights). In the example shown, two types of colored LEDs may be implemented, and the control circuit 106 may blend the amount of color generated by each of the colored LEDs 134a-134n and the colored LEDs 136a-136n and the amount of time to apply the blend of color to achieve particular wavelengths for deactivating color channels of the photochromic ink 142.

Figure 13:
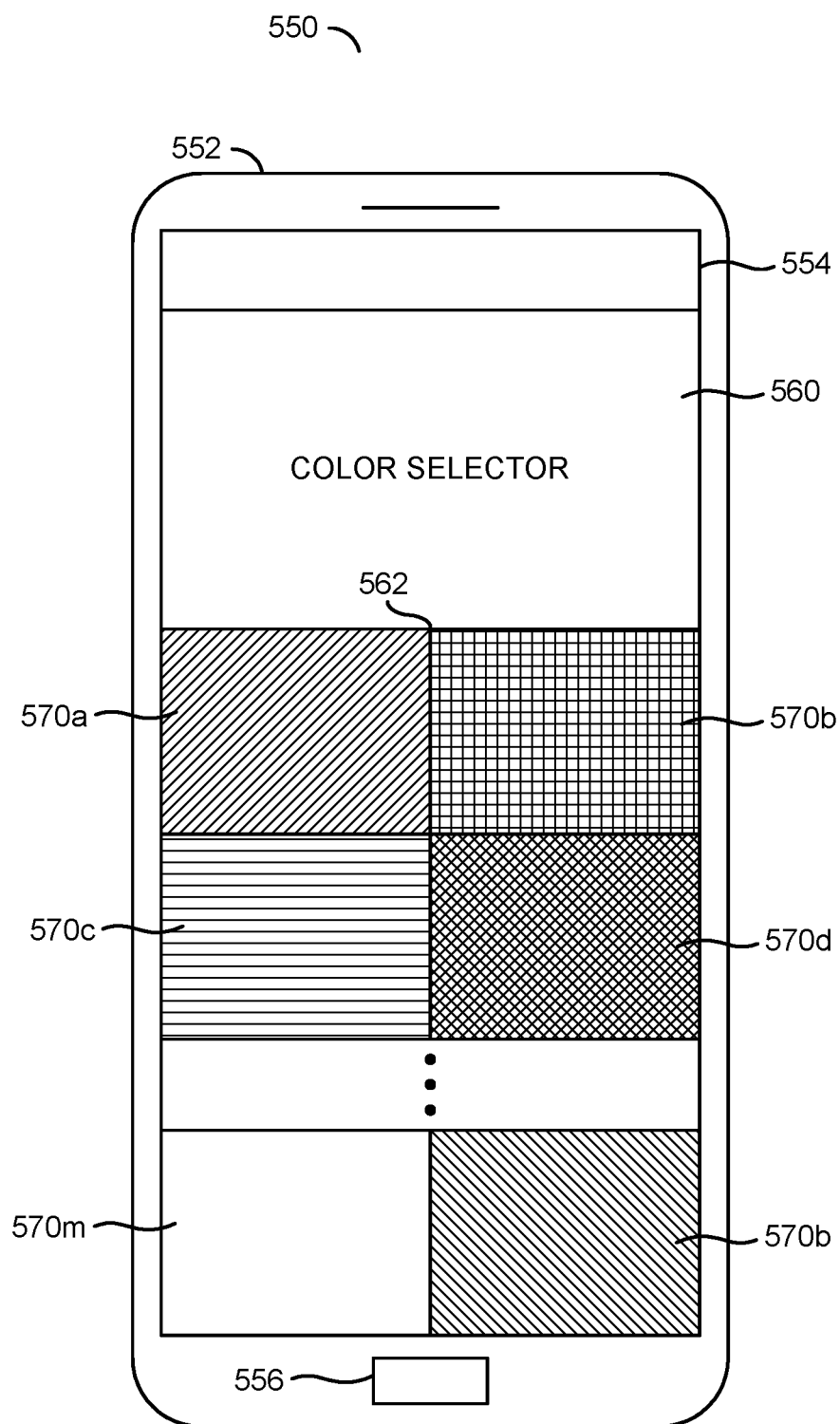
FIG. 13 is a diagram illustrating color selection using a smartphone companion app.

Referring to FIG. 13, a diagram illustrating color selection using a smartphone companion app is shown. An example color selection option 550 is shown. The example color selection option 550 may be implemented using a companion app for a smartphone. In another example, a companion app may be implemented for a smartwatch, a desktop computer (e.g., a Windows/MacOS/Linux program) and/or a dedicated control device. The type of device implementing the companion app may be varied according to the design criteria of a particular implementation.

A smartphone 552 is shown. The smartphone 552 may be a remote device configured to provide an input signal to the container 102. The smartphone 552 may comprise a touchscreen interface 554 and/or a button 556. The touchscreen interface 554 may be configured to receive user input (e.g., touches, taps, gestures, etc.) and/or display video output. The button 556 may be configured to receive input.

The touchscreen interface 554 is shown displaying a companion app 560. The companion app 560 may be configured to work with the system 100. In an example, the smartphone 552 may be configured to communicate with the system 100 using the communication device 112. In an example, the companion app 560 may be configured to read data from an application-program interface (API) provided by the communication device 112 and/or the control circuit 106 (e.g., to display information about the status of the light elements 104, an amount of time remaining for the steps 380a-380c, an amount of power remaining in the battery 108, etc. In another example, the companion app 560 may be configured to accept input from a user and provide the input to the API (e.g., to select a color for the photochromic ink 142 and/or to directly control the light elements 104). The capabilities of the companion app 560 may be varied according to the design criteria of a particular implementation.

The companion app 560 may provide a color selector 562. The color selector 562 may comprise various color options. In one example, the color options of the color selector 562 may be configured to enable the user to select the final result color (or pattern or texture) for the reactive object 140. In another example, the color options of the color selector 562 may be configured to enable the user to select the wavelengths for the visible light generated by the colored lights 132 (e.g., indirect control of the final result color for the reactive object 140).

In the example shown, the color selector 562 may comprise various color options 570a-570n. The user may tap one of the color options 570a-570n and the smartphone 552 may communicate the color selected to the communication device 112. In some embodiments, the color options 570a-570n may comprise preselected colors (e.g., the colors that may be best produced using the photochromic ink 142). In some embodiments, the color options 570a-570n may comprise favorite colors (e.g., colors previously selected by the user). In some embodiments, the color options 570a-570n may comprise any color (e.g., a color wheel providing a gradient of hue/saturation/brightness, an input for hexadecimal color codes, etc.). In the example shown, single color selections are shown. However, the color options 570a-570n may comprise other patterns/designs (e.g., color gradients, patterns, images, etc.). The interface for selecting one of the color options 570a-570n may be varied according to the design criteria of a particular implementation.

In some embodiments, the user may select one of the color options 570a-570n. The companion app 560 may convert the color selection into data readable by the control circuit 106. The smartphone 552 may communicate the data to the system 100 via the communication device 112. The control circuit 106 may read the color selection data. The control circuit 106 may determine the combination of the light elements 104 to apply to generate the selected color as the final result for the photochromic ink 142. The control circuit 106 may determine the amount of time to apply the UV lights 130a-130n and/or the colored lights 132. The control circuit 106 may communicate signals to the UV lights 130a-130n, the colored LEDs 134a-134n and/or the colored LEDs 136a-136n to perform the activation/deactivation of the photochromic ink 142. When the amount of time for applying the UV lights 130a-130n and/or the combination of the colored LEDs 134a-134n and/or the colored LEDs 136a-136n has passed, the control circuit 106 may generate notification data. The notification data may be generated in a format readable by the companion app 560. The notification data may be communicated by the communication device 112 to the smartphone 552. The companion app 560 may generate a notification to indicate to the user that the reactive object 140 is ready (e.g., the color/design has been achieved).

Figure 14:
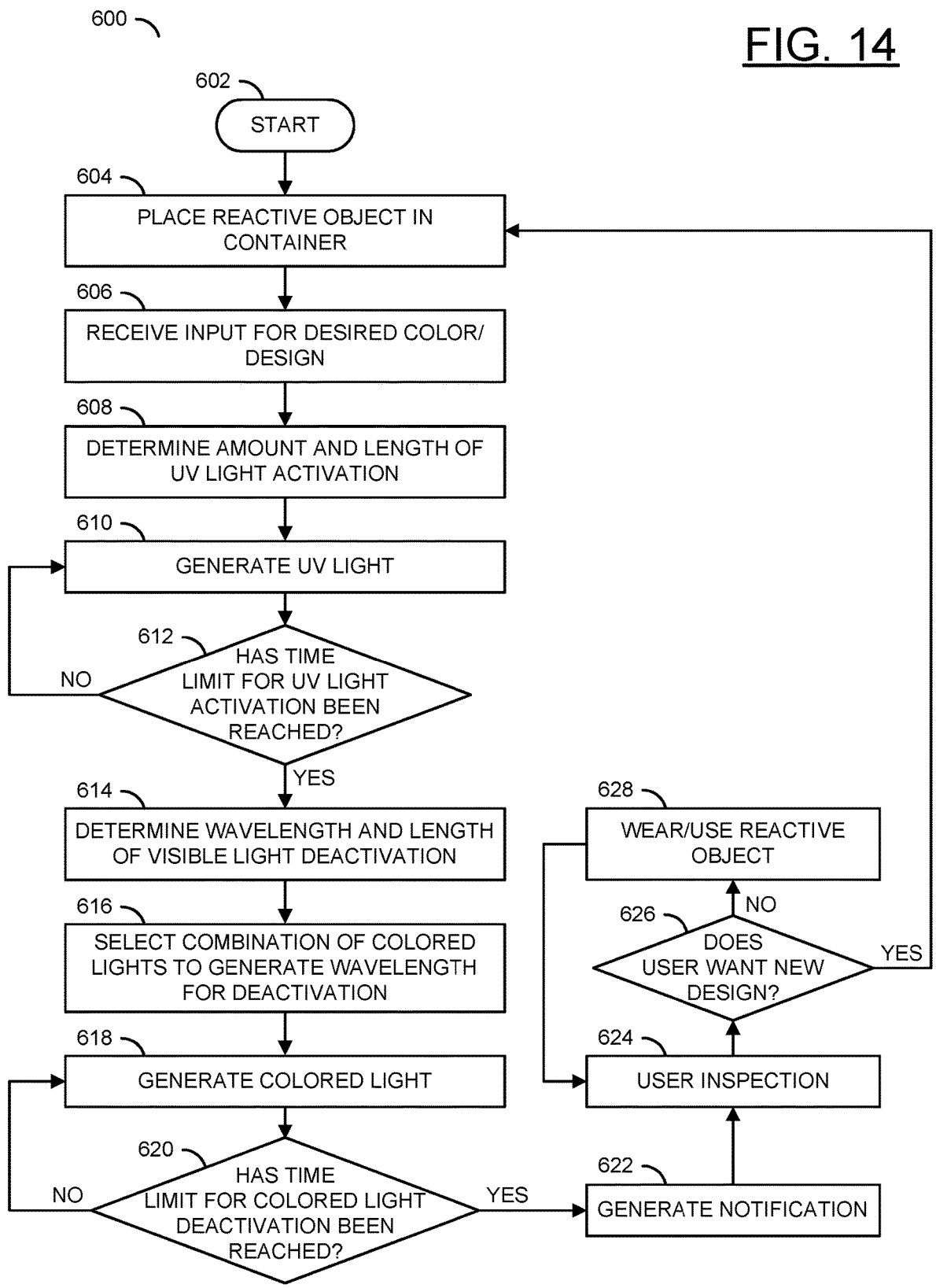
FIG. 14 is a flow diagram illustrating a method for applying a desired color to a reactive object.

Referring to FIG. 14, a method (or process) 600 is shown. The method 600 may apply a desired color to a reactive object. The method 600 generally comprises a step (or state) 602, a step (or state) 604, a step (or state) 606, a step (or state) 608, a step (or state) 610, a decision step (or state) 612, a step (or state) 614, a step (or state) 616, a step (or state) 618, a decision step (or state) 620, a step (or state) 622, a step (or state) 624, a decision step (or state) 626, and a step (or state) 628.

The step 602 may start the method 600. In the step 604, the user may place the reactive object 140 into the container 102. Next, in the step 606, the control circuit 106 of the container 102 may receive an input for a desired color/design for the reactive object 140. In one example, the control circuit 106 may read an input received from the companion app 560. In another example, the user may provide the input using the manual control circuit 106'. In still another example, the user may provide the input using another type of device connected via the input/output port 116. Next, the method 600 may move to the step 608.

In the step 608, the control circuit 106 may determine the amount and/or length of UV light activation. The amount and/or length of UV light activation may be determined in response to the desired color/design selected by the user. The control circuit 106 may determine the characteristics of the UV lights 130a-130n. Next, in the step 610, the UV lights 130a-130n may generate the UV light onto the reactive object 140. The UV light may activate the photochromic ink/dye 142 of the reactive object 140. For example, the control circuit 106 may activate the driver circuit of the UV lights 130a-130n according to the characteristics determined. Next, the method 600 may move to the decision step 612.

In the decision step 612, the control circuit 106 may determine whether the amount of time for the UV light activation has been reached. For example, the characteristics of the UV lights 130a-130n determined may comprise an amount of time, and the control circuit 106 may track the amount of time that the UV lights 130a-130n have been activated. The amount of time may be determined by the control circuit 106 in response to desired color/design selected by the user. If the amount of time has not been reached, then the method 600 may return to the step 610 (e.g., the UV light generated by the UV lights 130a-130n may continue to be applied to the reactive object 140). If the amount of time has been reached, then the method 600 may move to the step 614.

In the step 614, the control circuit 106 may determine a wavelength and/or length (e.g., amount of time) for applying the visible light for the deactivation of the color channels of the photochromic ink 142. The control circuit 106 may determine the characteristics of the colored lights 132 in response to the color/design selected by the user. Next, in the step 616, the control circuit 106 may select a combination of the colored lights 132 in order to generate the wavelength for the deactivation of the color channels of the photochromic ink 142. The control circuit 106 may determine the characteristics of the colored LEDs 134a-134n and/or the colored LEDs 136a-136n (e.g., a combination of colors to emit) in order to achieve the wavelength. In the step 618, the colored LEDs 134a-134n and/or the colored LEDs 136a-136n may generate the colored light (e.g., the light at the determined wavelength in the visible spectrum of light) to be applied onto the reactive object 140. The colored light may deactivate pre-determined color channels of the photochromic ink/dye 142 of the reactive object 140. For example, the control circuit 106 may activate the driver circuit of the colored LEDs 134a-134n and/or the colored LEDs 136a-136n according to the characteristics determined. Next, the method 600 may move to the decision step 620.

In the decision step 620, the control circuit 106 may determine whether the amount of time for the colored light deactivation has been reached. For example, the characteristics of the colored LEDs 134a-134n and/or the colored LEDs 136a-136n determined may comprise an amount of time, and the control circuit 106 may track the amount of time that the colored LEDs 134a-134n and/or the colored LEDs 136a-136n have been activated. The amount of time may be determined by the control circuit 106 in response to desired color/design selected by the user. If the amount of time has not been reached, then the method 600 may return to the step 618 (e.g., the visible and/or invisible spectrum light generated by the colored LEDs 134a-134n and/or the colored LEDs 136a-136n may continue to be applied to the reactive object 140). If the amount of time has been reached, then the method 600 may move to the step 622.

In the step 622, the control circuit 106 may generate a notification. The notification may indicate that the application of the selected color has been completed. In one example, the notification may be an audio tone and/or message generated by the speakers 110. In another example, the notification may be provided by a LED implemented on the external portion of the container 102 (e.g., a green light indicating the reactive object 140 is ready). In yet another example, the notification may be generated by the communication device 112 to provide a message (e.g., a push notification) that may be presented by the companion app 560. Next, in the step 624, the user may remove the reactive object 140 from the container 102 for inspection (e.g., to ensure that the final result of the color/design is as desired). Next, the method 600 may move to the decision step 626.

In the decision step 626, the user may determine whether a new design/color is desired. In one example, the user may desire a new color/design for the reactive object 140 if the output was not as expected. In another example, the user may desire a new color/design for the reactive object 140 is the color/design has faded (e.g., faded over time while being worn/used). In yet another example, the user may desire a new color/design because the user wants a change in style. If the user does not want a new design, then the method 600 may move to the step 628. In the step 628, the user may wear/use the reactive object 140. Next, the method 600 may return to the step 624 (e.g., the user may decide to change the color/design at any time). In the decision step 626, if the user does want a new design, then the method 600 may return to the step 604. For example, the user may repeat the steps 604-628 in order to select and/or apply a new color/design. The selecting and/or applying of a new color/design for the reactive object 140 may be repeated as many times as desired by the user.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    a container comprising (i) an outer shell comprising a material configured to protect contents of said apparatus and (ii) an inner surface, wherein (a) said outer shell is configured to open to enable said contents to be placed on said inner surface and (b) a cavity is formed within said container when said outer shell is closed;
    a first light source implemented on said inner surface and configured to activate all color channels of said contents in response to a signal;
    a second light source implemented on said inner surface and configured to deactivate a subset of said color channels in response to said signal; and
    a circuit configured to generate said signal in response to an input, wherein (i) said circuit is implemented between said outer shell and said inner surface and (ii) a reactive material of said contents of said container is configured to change appearance in response to said subset of said color channels deactivated by said second light source.

2. The apparatus according to claim 1, wherein (i) said container is an eyeglasses container and (ii) said contents are eyeglasses comprising a frame implementing said reactive material.

3. The apparatus according to claim 1, further comprising a battery configured to supply power to said first light source, said second light source and said circuit, wherein said battery is implemented between said outer shell and said inner surface.

4. The apparatus according to claim 1, further comprising a power converter configured to convert an input power from an external source to a power supply for said first light source, said second light source and said circuit.

5. The apparatus according to claim 1, wherein said circuit comprises a communication device configured to connect to a remote device and receive said input from said remote device.

6. A method for applying color to a reactive material, comprising the steps of:
    (A) inserting an object into a container, wherein (i) said container provides a controlled environment for said reactive material and (ii) said reactive material is applied to a portion of said object;
    (B) receiving an input, wherein said input is a result color for said reactive material;
    (C) determining characteristics of UV light to apply in response to said result color, wherein said characteristics of said UV light comprise a first amount of time;
    (D) determining characteristics of color spectrum light to apply in response to said result color, wherein said characteristics of said color spectrum light comprise (i) a combination of wavelengths and (ii) a second amount of time;
    (E) generating said UV light according to said characteristics of said UV light determined;
    (F) deactivating said UV light and generating said color spectrum light after said first amount of time has passed, wherein said color spectrum light is generated according to said combination of wavelengths; and
    (G) deactivating said color spectrum light after said second amount of time has passed, wherein
    (i) said UV light is applied to said portion of said object to activate color channels of said reactive material,
    (ii) said color spectrum light is applied to said portion of said object to deactivate particular color channels of said reactive material, and
    (iii) said combination of wavelengths determined for said color spectrum light is configured to deactivate said particular color channels to achieve said result color for said reactive material.

7. An apparatus comprising:
    a container configured to provide a controlled environment for an object comprising a reactive material;

a first light source implemented within said container and configured to activate all color channels of said reactive material in response to a signal;

a second light source implemented within said container and configured to deactivate a subset of said color channels in response to said signal; and a circuit configured to generate said signal in response to an input, wherein
  (i) said subset of said color channels deactivated by said second light source are determined by a characteristic of said second light source selected by said signal, and
  (ii) said reactive material of said object is configured to change appearance in response to said characteristic of said second light source.

8. The apparatus according to claim 7, wherein said characteristic of said second light source comprises a wavelength and said reactive material comprises a dye configured to change to a particular color in response to said wavelength of said second light source.

9. The apparatus according to claim 7, wherein said controlled environment provided by said container is configured to (i) provide an enclosure for said object and (ii) block external light sources.

10. The apparatus according to claim 7, wherein said reactive material is applied to a portion of said object.

11. The apparatus according to claim 10, wherein said first light source and said second light source are each configured to be aimed at said portion of said object.

12. The apparatus according to claim 7, wherein said reactive material is a photochromic dye.

13. The apparatus according to claim 7, wherein a size of said container is an appropriate size to enable said object to be enclosed within said container.

14. The apparatus according to claim 7, wherein said first light source and said second light source are each attached to said container.

15. The apparatus according to claim 7, wherein said first light source and said second light source are each movable within said container.

16. The apparatus according to claim 7, wherein said characteristic of said second light source is selected based on an external light source.

17. The apparatus according to claim 7, wherein (i) said change of said appearance of said reactive material is not permanent and (ii) said change of said appearance is affected over time in response to an external light source.

18. The apparatus according to claim 17, wherein said change of said appearance of said reactive material is reapplied in response to (i) activating all of said color channels using said first light source and (ii) deactivating said subset of said color channels using said second light source.

19. The apparatus according to claim 7, wherein said circuit is configured to select different versions of said characteristic of said second light source to be applied to particular locations of said reactive material on said object.

20. The apparatus according to claim 7, wherein (i) said first light source comprises ultraviolet lights and infrared lights, (ii) said second light source comprises RGB LEDs.

\* \* \* \* \*